United States Patent [19]
Leon et al.

[11] Patent Number: 5,644,688
[45] Date of Patent: Jul. 1, 1997

[54] BOOLEAN TRAJECTORY SOLID SURFACE MOVEMENT METHOD

[76] Inventors: Francisco A. Leon, 948 San Marcos Cir., Mountain View, Calif. 94043; Satoshi Tazawa, 2385 17, Okata, Atsugi shi, Kanagawa 243, Japan; Gregory Anderson, 96-G Escondido Village, Stanford, Calif. 94305

[21] Appl. No.: 398,410

[22] Filed: Mar. 2, 1995

Related U.S. Application Data

[63] Continuation of Ser. No. 904,003, Jun. 24, 1992, abandoned.

[51] Int. Cl.$^6$ ................................................ G06T 17/40
[52] U.S. Cl. ............................................ 395/120; 364/491
[58] Field of Search ................................ 395/119, 120, 395/123, 141; 364/491

[56] References Cited

U.S. PATENT DOCUMENTS

| | | | |
|---|---|---|---|
| 4,208,810 | 6/1980 | Rohner et al. | 434/43 |
| 4,554,625 | 11/1985 | Otten | 364/148 |
| 4,785,399 | 11/1988 | Evans et al. | 395/156 |
| 4,797,842 | 1/1989 | Nackman et al. | 364/578 |
| 4,819,161 | 4/1989 | Konno et al. | 364/511 |
| 4,912,664 | 3/1990 | Weiss et al. | 364/577 |
| 4,933,889 | 6/1990 | Meshkat et al. | 364/578 |
| 5,036,316 | 7/1991 | Kemplin | 395/118 |
| 5,067,101 | 11/1991 | Kunikiyo et al. | 364/578 |
| 5,070,469 | 12/1991 | Kunikiyo et al. | 364/578 |
| 5,125,038 | 6/1992 | Meshkat et al. | 382/22 |
| 5,159,512 | 10/1992 | Evans et al. | 395/119 |
| 5,214,752 | 5/1993 | Meshkat et al. | 395/123 |

OTHER PUBLICATIONS

R.C. Evans, G. Koppelman, V.T. Rajan, Shaping Geometric Objects by Cumulative Translational Sweeps, May 1987, IBM J. Res. Develop. vol. 31, No. 3, pp. 343–360.

Aristides A.G. Requicha, Representations for Rigid Solids: Theory, Methods, and Systems, Production Automation Project, College of Engineering and Applied Science, The University of Rochester, New York, 14627, 1980, pp. 437–465.

(List continued on next page.)

*Primary Examiner*—Mark K. Zimmerman

[57] ABSTRACT

A method for simulating changes to the topography of a workpiece, e.g. a semiconductor wafer, as it undergoes process steps. The method may be used to simulated isotropic or anisotropic deposition or etch process steps. A solids modeling system is used to define and deform material solids. Material solids represent the different materials on a workpiece. A plurality of trajectory solids are constructed to cause the deformation of the material solids. Deformation of a material solid is accomplished through the performance of boolean operations between the material solid and one or more trajectory solids. A characteristic of a trajectory solid, e.g. a radius or height, relates to the rate of etch or deposition for the particular process step. The method of construction of trajectory solids in the present invention enables simulation of spatially varying process steps, avoids the creation of invalid self-intersecting surfaces and minimizes the creation of small edges that lead to irregular surfaces.

16 Claims, 32 Drawing Sheets

OTHER PUBLICATIONS

A. Baer, C. Eastman, M. Henrion, Geometric Modelling: A Survey, IPC Business Press, vol. 11, No. 5, Sep. 1979, pp. 253-272.

Matsato Fujinaga, Norihiko Kotani, Tatsuya Kunikiyo, Hidekazu Oda, Masayoshi Shirahata, Yoichi Akasaka, Three–Dimensional Topography Simulation Model Etching and Lithography, IEEE Transactions on Electron Devices, vol. 37, No. 10, Oct. 1990, pp. 2183-2192.

T.S. Cale, G.B. Raupp, T.H. Gandy, Ballistic Transport–Reaction Prediction of Film Conformality in Tetraethoxysilane $O_2$ Plasma Enhanced Deposition of Silicon Dioxide, American Vacuum Society, J. Vac. Sci. Technology A. 10(4), Jul./Aug. 1992, pp. 1128-1134.

George M. Koppelman, Michael A. Wesley, Oyster: A Study of Integrated Circuits as Three–Dimensional Structures, IMB J. Res. Develop., vol. 27, No. 2, Mar. 1983, pp. 149-163.

R.N. Wolf, M.A. Wesley, J.C. Kyle, Jr., F. Gracer, W.J. Fitzgerald, IBM Journal of Research and Development: Solid Modeling for Production Design, vol. 31, No. 3, May 1987, pp. 277-295.

J. Pelka, M. Weiss, W. Hoppe, D. Mewes, The Influence of Ion Scattering on Dry Etch Profiles, J. Vac. Sci. Technology B., vol. 7, No. 6, Nov./Dec./1989, pp. 1483-1487.

M. Mazhar Islamraja, J.P. McVittie, M. Cappelli, K.C. Saraswat, A General Analytical Model for Low–Pressure Deposition in 3-D Structures, pp. 93-94.

Toshiharu Matsuzawa, Tetsui Ito, Masaya Tanuma, Three–Dimensional Photoresist Image Simulation on Flat Surfaces, IEEE Transactions On Electron Devices, vol. ED-32, No. 9, Sep. 1985, pp. 1781-1783.

Tetsuo Itoh, Toshihar Matsuzawa, Kazuya Kadota, Duichi Hanashima, A Three–Dimensional Resist Shape Simulator and its Application to Sub–Micron VLSI Process, Musashi Works, Hitachi, Ltd., Kodaira-shi, 187 Japan, vol. J70-C, No. 3, pp. 332-340.

Tatsumi Ishizuka, Three–Dimensional Simulation in Photoresist Development, Fuji Research Institute Corporation, Tokyo, 108 Japan, vol. J73-C-II, No. 11, pp. 775-785.

Yoshihiko Hirai, Saddafumi Tomida, Kazushi Ikeda, Masaru Sasogo, Masayki Endo, Sigeru Hayama, Noboru Nomura, Three–Dimensional Resist Process Simulator Peace (Photo and Electron Beam Lithography Analyzing Computer Engineering System), IEEE Transactions on C.A.D., vol. 10, No. 6, Jun. 1991, pp. 802-807.

Silvaco International, Solid: Three–Dimensional Lithography Simulation Software, Version 1.06, User's Manual Introduction, Jul. 31, 1991, pp. 1-3, available from Silvaco International, Santa Clara, California.

R. Sedgewick, Algorithms: Finding the Convex Hull, pp. 321-333.

I.V. Katardjiev, Simulation of Surface Evolution During Ion Bombardment, J. Vac. Sci. Technology A 6(4), Jul./Aug. 1988, pp. 2434-2442.

R. Smith, M.A. Tagg, G. Carter, M.J. Nobes, Erosion of Corners and Edges on an Ion–Bombarded Silicon Surface, Journal of Materials Science Letters (1986), pp. 115-120.

I.V. Katardjiev, G. Carter, M.J. Nobes, R. Smith, Precision Modeling of the Mask–Substrate Evolution During Ion Etching, J. Vac. Sci. Technology A 6(4), Jul./Aug. 1988, pp. 2443-2450.

Bruce Schachter, Decomposition of Polygons into Convex Sets, IEEE Transactions on Computers, vol. C-27, No. 11, Sep. 1978, pp. 1078-1080.

Tim Thurgate, Segment–Based Etch Algorithm and Modeling, IEEE Transactions on Computer–Aided Design, vol. 10, No. 9, Sep. 1991, pp. 1101-1109.

Eric S.G. Shaqfeh, Charles W. Jurgensen, Simulation of Reactive Ion Etching Pattern Transfer, J. Appl. Phys. 66(10), Nov. 15, 1989, pp. 4664-4675.

E.W. Scheckler, K.K.H. Toh, D.M. Hoffstetter, A.R. Neureuther, 3D Lithography, Etching, and Deposition Simulation (Sample-3D), 1991 Symposium on VLSI Technology Digest of Technical Papers, May 28-30, 1991/OISO, pp. 97-98.

R. Sedgewick, "Algorithms", Addison–Wesley Publishing Co. Massachusetts, 1983, pp. 321-332.

BOOLEAN TRAJECTORY SOLID SURFACE MOVEMENT METHOD

This is a continuation of application Ser. No. 07/904,003, filed Jun. 24, 1992, now abandoned.

BACKGROUND OF THE INVENTION

1. Field of the Invention

The present invention relates to the field of computer aided design, in particular a three-dimensional solids modeling approach for simulating the manufacture of integrated circuits.

2. Description of the Related Art

The computer simulation of the manufacture of integrated circuits is commonly referred to as process simulation. Process simulation is a valuable tool in the design and manufacture of integrated circuits. It has the benefits of reducing design times and reducing experimentation and manufacturing costs. In practice, process simulation involves determining the effect of the successive deposition (i.e. depositing material), etch (i.e. removing material), lithography or other process steps on a semiconductor wafer during manufacture. Broadly speaking, process simulation can be divided into topography simulation and bulk process simulation. Topography simulation, which can be used with such process steps as deposition, etch, and lithography, is concerned mainly with the change of the geometry of the materials comprising a semiconductor wafer. Bulk process simulation, which is used with such processes as diffusion, ion implantation and oxidation, is concerned mainly with the re-distribution of the dopant impurities in the semiconductor devices. Oxidation is actually an intermediate case, affecting both the geometry and the distribution of dopant impurities.

Another application of process simulation is to create computer representations of wafer structures for use by other analysis programs. Such analysis programs can then calculate properties of the device, such as electrical characteristics, thermal properties, mechanical properties, etc.

In the design of semiconductors, it is the shape and composition of the resulting structure which cause it to operate correctly. It is useful to be able to view the layers comprising a semiconductor wafer during the manufacturing process in order to identify undesirable shapes or results. For example, if a particular layer is etched too deep, e.g. it inadvertently exposes a second layer, a visual inspection can readily detect the error. This avoids the costly and time consuming alternatives of manufacturing and testing wafers. Additionally, a computer simulation provides for viewing what may only be visible with an electron microscope.

Topography simulation is complicated by the fact that various shapes result during the steps of different process technologies. FIGS. 1a–1c represent various shapes that are created at convex and concave plane interfaces. A convex plane interface is one where outer surface of the planes is greater than 180 degrees. A concave plane interface is one where the outer surface of the planes is less than 180 degrees. Referring to FIG. 1a, an original material having the shape 102 has undergone an isotropic etch process step resulting in the shape 101. Vertex points 103 and 104 of shape 102 are positioned at concave intersections between two faces. It should be noted that the faces define a 90 degree (or sharp) angle at the vertex points 103 and 104. As illustrated in shape 101, at points 105 and 106, the resulting interface at the concave interface is rounded. However, when comparing the convex intersection points 107 and 108 of shape 102 with their counterparts 109 and 110 of shape 101, it is observed that a 90 degree (sharp) edge is maintained.

FIG. 1b illustrates the effect during an isotropic deposition process step. Vertex points 125 and 126 of shape 122 are positioned at concave intersections between two faces. It should be noted that the faces define a 90 degree (or sharp) angle at the vertex points 125 and 126. As illustrated in shape 121, at points 123 and 124, the resulting interface at the concave interface retains a 90 degree (sharp) edge. However, when comparing the convex intersection points 129 and 130 with their counterparts 127 and 128, it is observed that a rounded edge is created.

A further condition of the wafer that must be accurately simulated are voids. Voids are created during deposition process steps. Such a void is illustrated in FIG. 1c. In FIG. 1c, metal lines 150 are to be separated from a subsequent layer by an oxide deposition. The deposition will generally occur over successive layers, here illustrated by layers 151, 152 and 153. Between the layers 151, and 152 a void 154 has been created. It is desirable not to have voids in a wafer. For example, during fabrication it may be a source of gaseous build ups that may subsequently explode and destroy portions of the wafer.

Two-dimensional (2-D) process simulation is known in the art and is used extensively. Such prior art 2-D process simulation tools include SUPREM (available from Stanford University) and SAMPLE (available from the University of California at Berkeley). However, 2-D process simulation does not provide all desired simulation results. For example, as the miniaturization of circuits increase, 2-D process simulators do not have the capabilities to accurately predict certain features, e.g. the shape around a hole or an intersecting point of metal lines. Three-dimensional (3-D) process simulation is desirable in order to obtain more precise and complete simulation results.

Three-dimensional (3-D) process simulation tools are known in the art. One such 3-D process simulation tool is the Oyster system. The Oyster system is an internally used process simulation tool of the IBM Corporation and is described in detail in an article entitled "OYSTER: A Study of Integrated Circuits as Three-Dimensional Structures," G. M. Koppelman and M. A. Wesley, *IBM Journal of Research and Development* 276, No. 2 pgs 149–163 (1983). The Oyster system is based on a more general concept of solids modeling. In the Oyster system, a geometric model represents the materials comprising the topography of a wafer as solids. Changes to the topography are created using geometric operations (i.e. boolean set operations). The Oyster system is built around a general solid modeling tool that provides the basic operations and data structures for a simulation.

The Oyster system utilizes a theoretical construct of a Cumulative Translational Sweeps (CTS) for shaping geometric objects. The CTS is used in combination with boolean set operations to simulate growth and shrinking over boundary regions of geometric objects. This aspect of the Oyster System, termed the CTS method, is described in detail in the publication entitled "Shaping Geometric Objects by Cumulative Translation Sweeps", R. C. Evans, G. Koppelman, V. T. Rajan, *IBM Journal of Research and Development*, pgs. 343–360, Volume 31, No. 3, May 1987 and in U.S. Pat. No. 4,785,399, entitled "Shaping Geometric Objects by Cumulative Translational Sweeps".

As described above, the CTS method operates over the boundary regions of polyhedral representations of solid objects, using shaping polyhedrons (or shaping objects). A requirement in the CTS method is that a shaping polyhedron be from the polytope family of zonetopes. Generally, the CTS method provides for surface movement using the following steps:

1. Defining a set of translation vectors which are characteristic of the desired surface movement.
2. Sweeping the shaping object along the first translation vector to create an intermediate solid that includes the shaping object. If there is only one translation vector, this becomes the new solid.
3. Sweep preceding intermediate solid along remaining translation vectors.

The CTS method sweeps the entire object at one time along the translation vector. As a result, the CTS method does not provide for simulation of process steps with spatially varying, etch or deposition rates. An example of a spatially varying process step is a sputter deposition.

The use of a solid modeling approach for 3-D topography simulation is desirable since general 3-D solids modeling systems are commercially available. However, the data representations of the solids in such systems may not be ideal for creating and manipulating the structures needed for accurate and efficient topography simulation. In particular, data structures for representing adjacent materials are not commonly available.

Current techniques for the deformation of surface (which occurs in simulation of etch or deposition) are also not ideal. For example, a boundary representation model is often used to represent solids. Such representations become invalid when the boundaries of the solid intersect, i.e. the representation becomes self-intersecting. The representations may become invalid as they are re-formed during a process step. Such invalid representations will not allow for creation of accurate simulation results and may be unacceptable for further processing by the solids modeling system.

Several other modeling techniques for 3-D topography simulation are known in the art, namely a ray tracing model, a cell model, a network model, a diffusion model and a string model. The ray tracing model has heretofore only been used in photolithographic processing steps and is not discussed here in any detail.

The cell model is used in 3-D deposition and etch simulation. However, it has been found that the cell model does not adequately represent a curved surface. The network model is an improvement to the cell mode where surface points are defined on each edge of surface tetrahedron cells. The diffusion model is also an improvement to the cell model and uses concentration contour as a surface definition. However, as with the cell model, both the network and diffusion models have been found to have difficulty in precisely treating curved surfaces as may occur during a process step.

The string model is also an approach with merit, but it often creates invalid self-intersection structures. Techniques for correcting for such self-intersecting structures have been developed, but are known to be very complex.

Another concern with any topography simulation tool is it's compatibility with other components of the process simulation environment. As described above, topography simulation is only one component of process simulation. In order to create a synergistic process simulation environment, tradeoffs should be made wherein the overall process simulation environment is improved. For example, the accuracy of the topography simulation may be traded off to create better input to an analysis (e.g. electrical or thermal) program. Such improvements may perhaps be to the detriment of one of the components of the process simulation environment.

It is an object of the present invention to provide a 3-D topography simulation tool that addresses the limitations of the CTS method. Further, it is an object of the present invention to have a solid representation created that is synergistic with other components of the process simulation environment.

SUMMARY

A method for simulating the changes to the topography of a workpiece, e.g. a semiconductor wafer while it is undergoing isotropic or anisotropic deposition and/or etch process steps, is described. A solids modeling system is used to define and deform material solids. Material solids are defined using a boundary representation model. Each material solid represents one of a plurality of materials that comprise the wafer. Further defined is a trajectory solid. A trajectory solid corresponds to the rate of etch or deposition for a process step. Deformation of a material solid is accomplished through the performance of boolean set operations between a material solid and a trajectory solid.

The method of the present invention generally involves the steps of: constructing a first trajectory solid at each vertex point of a material solid to be deformed, performing a boolean operation between the material solid and each of the first trajectory solids, constructing a second trajectory solid at each edge of the material solid at each edge of the material solid, performing a boolean operation between the material solid and each of the second trajectory solids, constructing a third trajectory solid at each face of the material solid and performing a boolean operation between the material solid and each of the third trajectory solids. A deposition process step is simulated using a boolean set union operation, while an etch process step is simulated using a boolean set difference operation.

The construction of trajectory solids is critical to the simulation results. The construction of trajectory solids in the present invention enables simulation of spatially varying process steps, avoids the creation of invalid self-intersecting surfaces and minimizes the creation of small edges and faces that lead to irregular surfaces.

DETAILED DESCRIPTION OF THE PREFERRED EMBODIMENT

A method for simulating changes to the topography of a Very Large Scale Integration (VLSI) wafer as it is being manufactured, is described. The preferred embodiment is directed towards both isotropic and anisotropic deposition and etch process steps as used in the manufacture of semiconductor wafers. It would be apparent to one skilled in the art to use the present invention in the context of manufacturing other non-semiconductor products, e.g. micro machines. Any product manufacturing process using VLSI type technology could be simulated by the preferred embodiment of the present invention.

In the following description, numerous specific details are set forth such as data structures, the effect of Boolean set operations, etc., in order to provide a thorough understanding of the present invention. It will be apparent, however, to one skilled in the art that such detail is known to those skilled in the art and that the present invention may be practiced without these specific details. In other instances, well-known functions e.g. general solids creation, have not been described in detail in order not to unnecessarily obscure the present invention.

Overview of a Computer System in the Preferred Embodiment

The method of the preferred embodiment may be practiced on any commercially available computer system that supports three-dimensional (3-D) graphics and a solids modeling system. Preferably, the present invention is practiced on a microcomputer systems such as an IRIS® Workstation, available from Silicon Graphics Corporation of Mountain View, Calif. or the RS/6000 Workstation available from the IBM Corporation of Armonk, N.Y. Of course, the present invention may also be implemented on a multi-user system while encountering all of the cost, speed and function advantages and disadvantages associated with these machines.

Figure 1A:
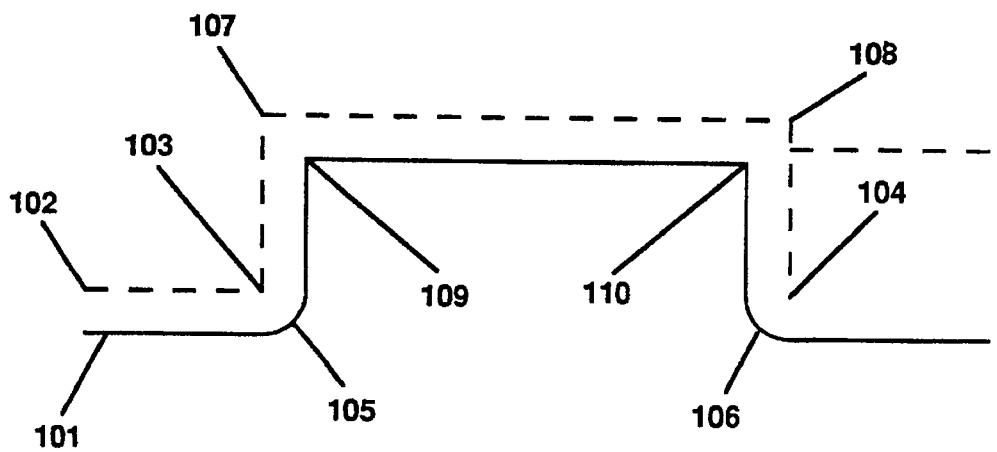
FIGS. 1a–1b illustrate distinct characteristic shapes resulting from deposition and etch process steps.
Figure 1B:
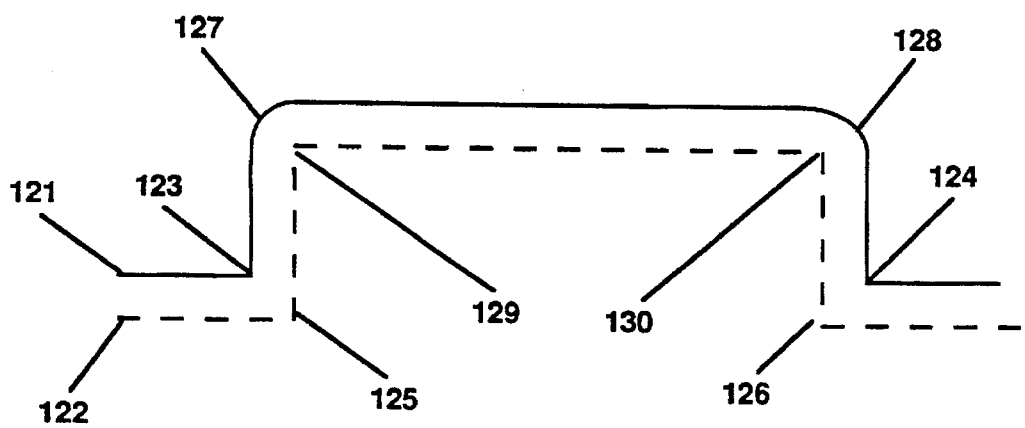
Figure 1C:
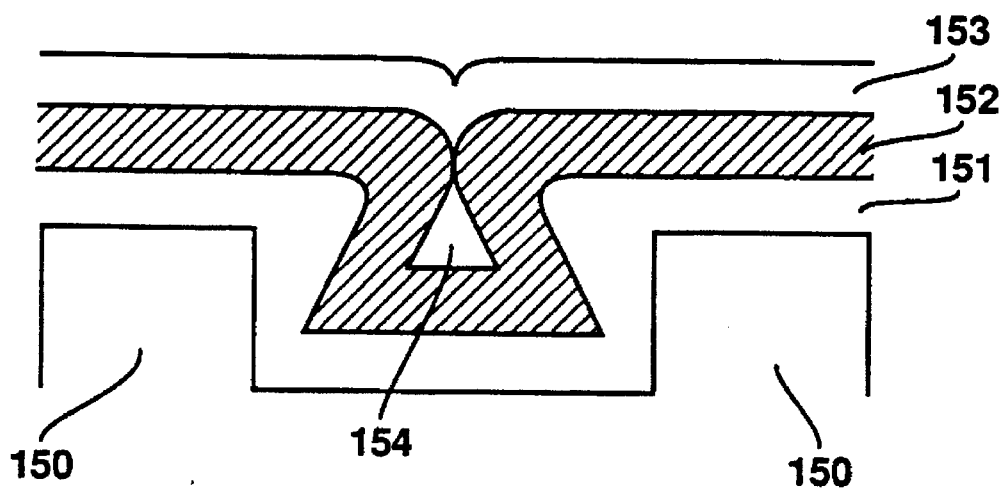
FIG. 1c illustrates a void created during a deposition process step.
Figure 2:
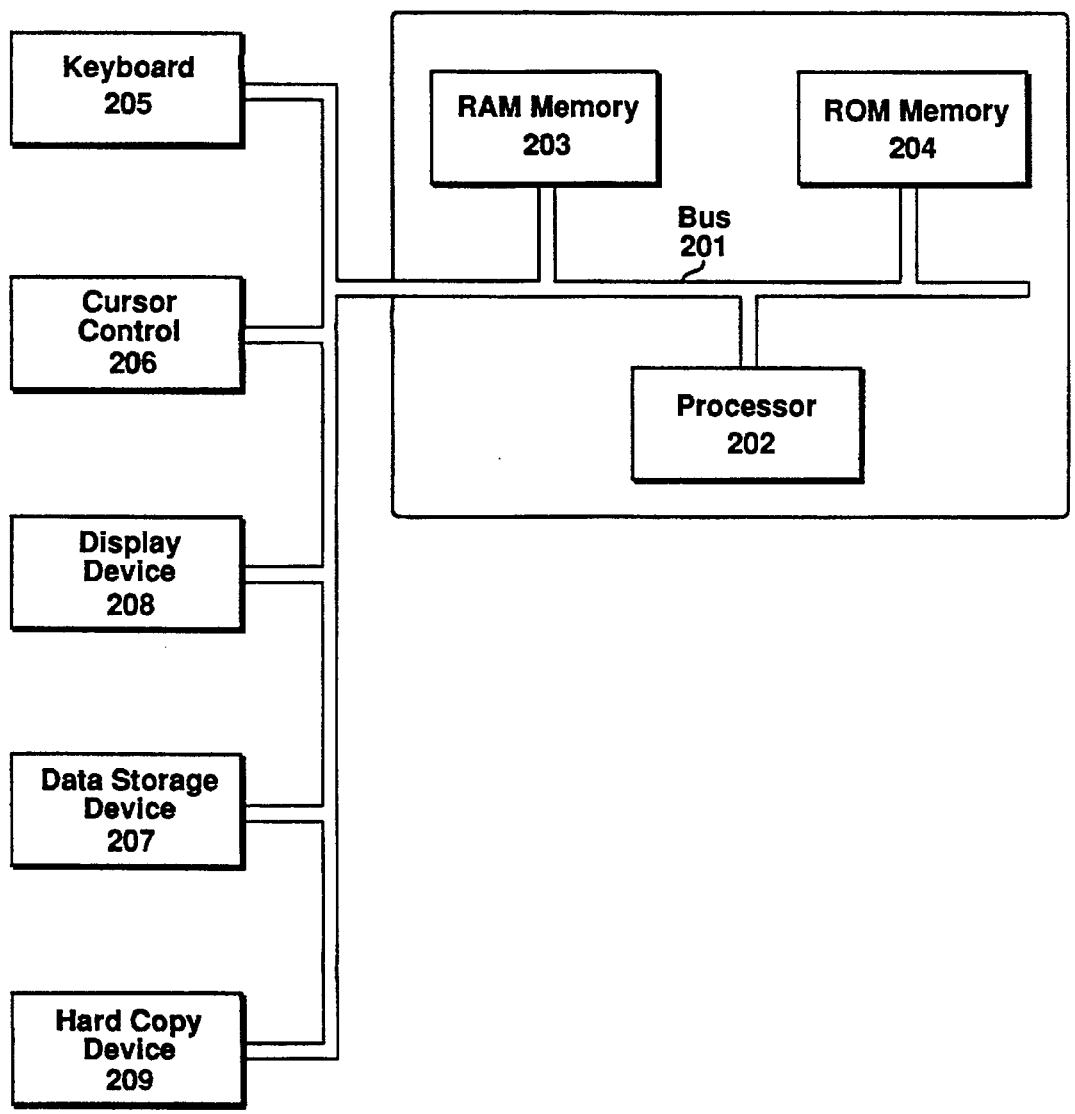
FIG. 2 illustrates a computer system on which the preferred embodiment of the present invention may be practiced.

Referring to FIG. 2, a computer system as may be utilized by the preferred embodiment generally comprises a bus or other communication means 201 for communicating information, a processing means 202 coupled with said bus 201 for processing information, a random access memory (RAM) or other storage device 203 (commonly referred to as a main memory) coupled with said bus 201 for storing information and instructions for said processor 202, a read only memory (ROM) or other static storage device 204 coupled with said bus 201 for storing static information and instructions for said processor 202, a data storage device 207, such as a magnetic disk and disk drive, coupled with said bus 201 for storing information and instructions, an alphanumeric input device 205, e.g. a keyboard including alphanumeric and other keys coupled to said bus 201 for communicating information and command selections to said processor 202, a cursor control device 206, such as a mouse, track-ball, cursor control keys, etc., coupled to said bus 201 for communicating information and command selections to said processor 202 and for controlling cursor movement and a display device 208, preferably a display device capable of 3-D graphics images, for displaying the result of a process simulation step. Additionally, it is useful if the system includes a hardcopy device 209, such as a printer, for providing permanent copies of information.

Overview of the Topography Modeling Environment of the Preferred Embodiment

The preferred embodiment of the present invention extends known solids modeling functions to simulation of the manufacture of semiconductor wafers (i.e. process simulation). Solids modeling traditionally refers to Computer Aided Design (CAD) tools that facilitate the design or assembly of physical structures, e.g. buildings, that are more or less static in nature. Here solids modeling techniques are being extended and adapted to dynamic deformation of the material layers in a semiconductor wafer, in response to some provided stimuli (e.g. a process step).

A solids modeling system typically provides for the definition of solids as a collection of structural elements. Additionally, a solids modeling system may provide for creation of new or re-defined solids through the combination of one or more existing solids. In the preferred embodiment, the Geometric WorkBench (GWB) available from Helsinki University of Technology is utilized as the solids modeling system. However, the use of other solid modeling tools would not depart from the spirit and scope of the present invention.

Known solids modeling systems are not readily usable for simulating the manufacture of semiconductor wafers because they are not able to represent and adequately simulate or describe the multiple materials comprising a semiconductor wafer. The preferred embodiment addresses this by supplementing the standard data structures and adding function to the preferred solids modeling system. This is discussed in greater detail below. Further, the preferred embodiment provides for the generation of data that is used to provide to the solid modeler in order to simulate the changes in the topography of a semiconductor wafer.

Figure 3:
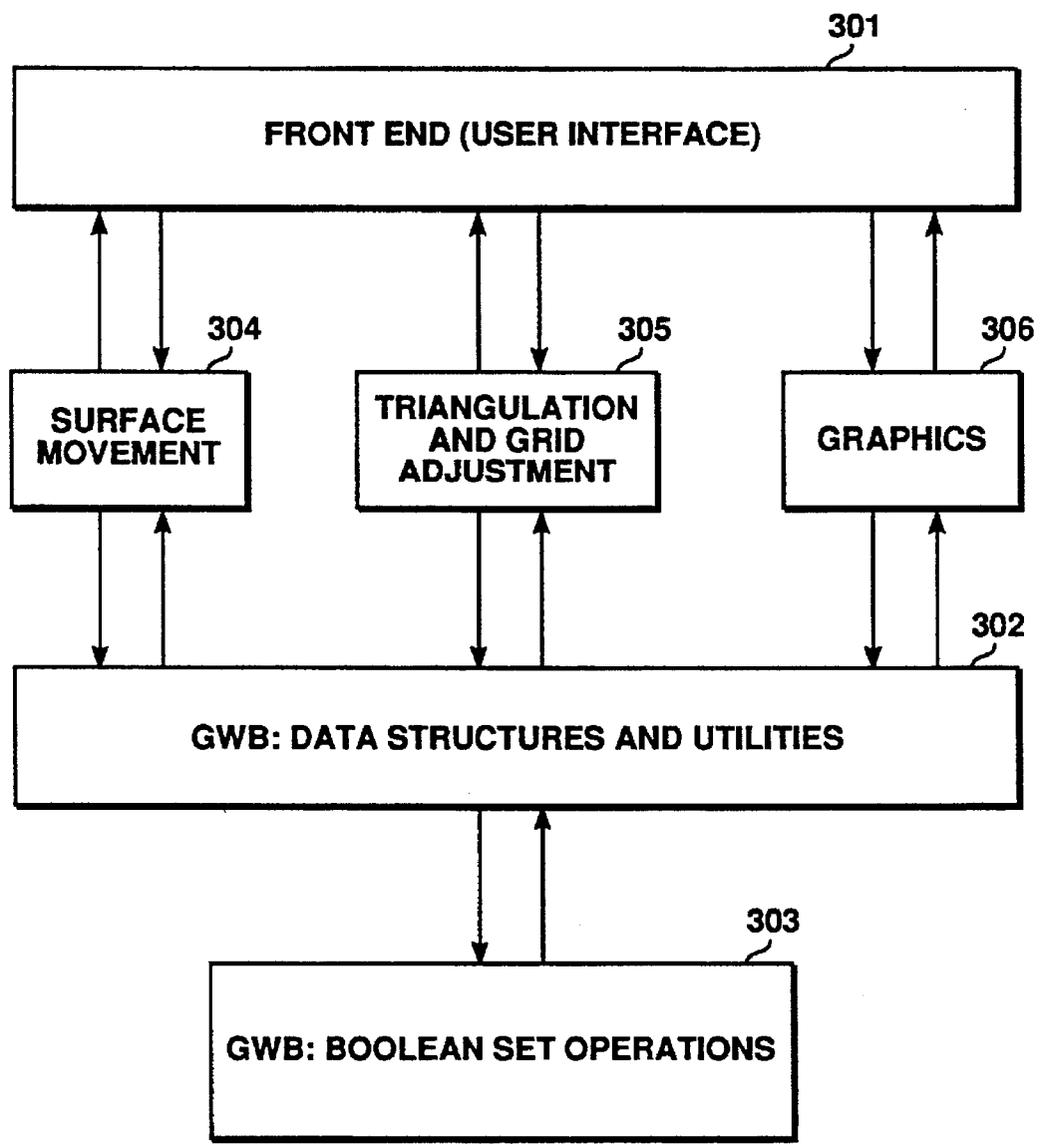
FIG. 3 illustrates the basic system structure of the preferred embodiment of the present invention.

FIG. 3 overviews the system structure of the preferred embodiment. A front-end user interface 301 provides the means by which a user communicates with the operating software embodiment of the present invention. A front-end user interface 301 is a combination of features provided by the operating system interface and the application software.

GWB solid modeler data structures and utilities 302 coupled with GWB Boolean Set Operations 303 provide the basic solids modeling system of the preferred embodiment. It should be noted that GWB utilities and Boolean Set Operations are premised on a GWB data structure. Thus, although the data structure may be supplemented, it's organization cannot be changed. The GWB data structures and Boolean Set Operations are described in more detail below.

Surface movement module 304 is positioned between the user interface 301 and GWB Data Structures and Utilities 302. The surface movement module takes input provided by the user to construct trajectory solids which are used in the deformation of object solids that simulate the different processing steps. Triangulation and grid adjustment module 305 provides for modifying the composition of polygons making up one of the faces of an object solid. Surface movement as well as triangulation and grid adjustment, are discussed in greater detail below.

Graphics module 306 provides the basic graphic routines for displaying the final structure after simulation of a process step.

Figure 4:
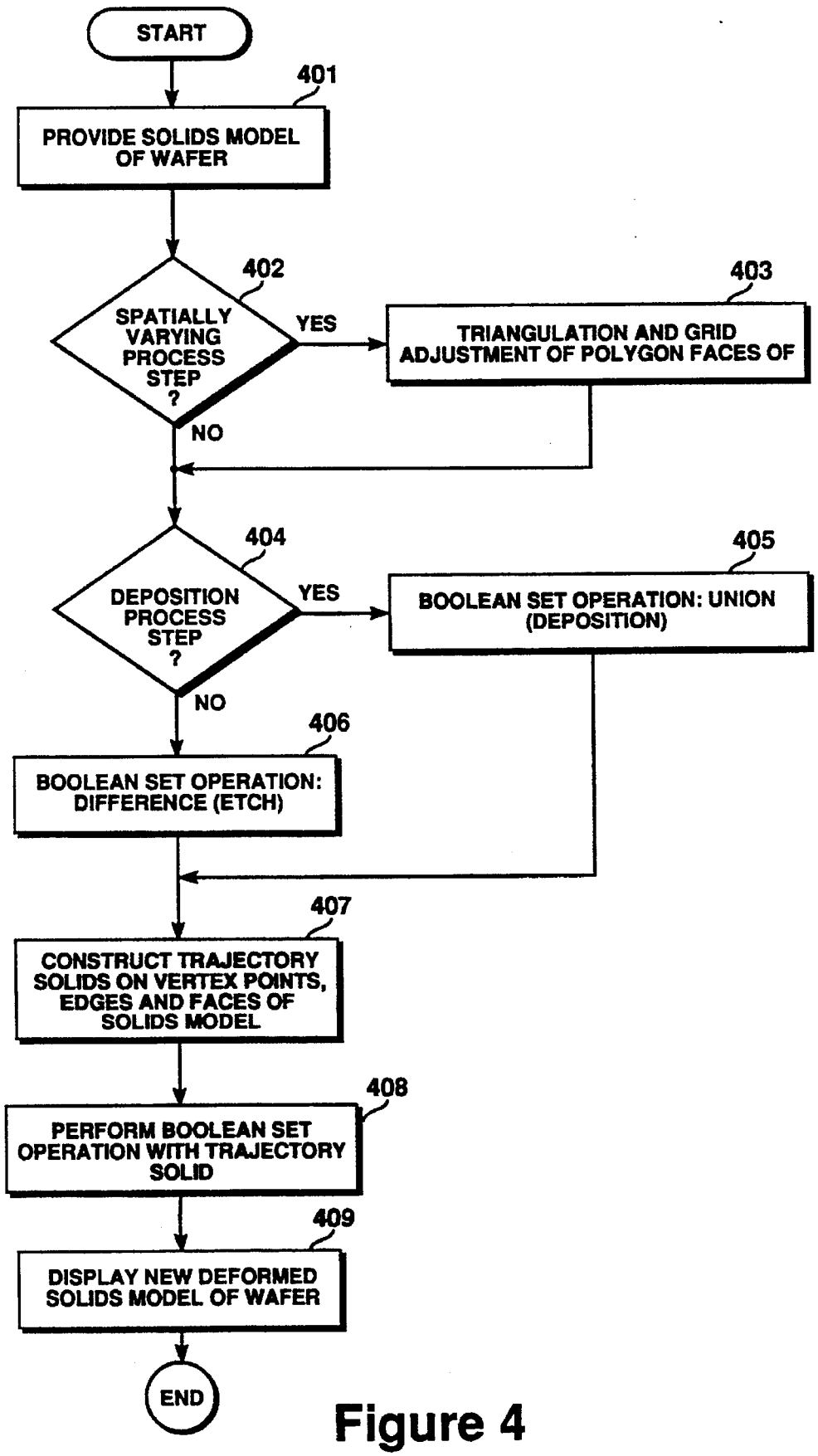
FIG. 4 is an operational flowchart of topography simulation as may be utilized by the preferred embodiment of the present invention.

FIG. 4 describes the flow of operation of the topography simulator of the preferred embodiment. First, a model (or solids structure) of the wafer is provided, step 401. A model may be provided in one of two ways. If the structure is already created, it is a matter of loading the existing structure into a space in the computer memory. If the existing structure is 2-D, it must first undergo transformation to a 3-D structure. Such 2-D to 3-D transformations are known in the art. If the solid model structure has not been created, it is a matter of creating the 3-D solid model structure. The initial solid model structure is created via utilities provided by the solid modeler system.

It must then be determined whether the process step being performed is spatially varying, step 402. If the process step is spatially varying, then polygons which comprise faces in the structure, must be triangles and thus undergo triangulation and grid adjustment, step 403. It would be obvious to one skilled in the art to cause triangulation to always occur. However, such triangulation increases the simulation time due to an increase of structural elements to process.

The particular type of process is then determined, step 404. If the process step is a deposition, the boolean operator will be a union operation, step 405. If the process step is an etch, the boolean operator will be a difference operation, step 406.

Next, the construction of trajectory solids occurs, step 407. Trajectory solids are defined as the locus of etch or growth trajectories, emanating from a vertex, edge or face. Trajectory solids are represented by a 3-D solid in which the surface is given by the endpoints of the trajectories. As will be described in more detail below, a trajectory solid will be constructed for each vertex, edge and face of a material object solid that is being deformed. A trajectory solid is used to define the amount of deformation that the original material object solid will undergo. The trajectory solid is created with respect to a isotropic or anisotropic etch or deposition rate. The isotropic or anisotropic etch or deposition rate is calculated according to parameter information for the process step and the material solid. Once the trajectory solid is constructed, the previously determined boolean operation is performed between the trajectory solid and the material object solid being deformed, step 408. The creation of trajectory solids and the corresponding boolean set operation are not order sensitive. Thus, any sequence of creating a trajectory solid and performing a boolean set operation may be utilized without departing from the spirit and scope of the present invention. In any event, once the final trajectory solid is created and boolean set operation performed, the new solid structure of the wafer is displayed, step 409.

Generally, the topography modeler of the preferred embodiment does not operate in a time step fashion, i.e. the intermediate results of a process simulation are not calculated. This has the effect of speeding-up the simulation of a particular process step. However, it would be apparent to one skilled in the art to integrate a time-stepped approach for particular material structures. Use of time-stepping would not depart from the spirit and scope of the present invention.

Boolean Set Operations

Figure 5A:
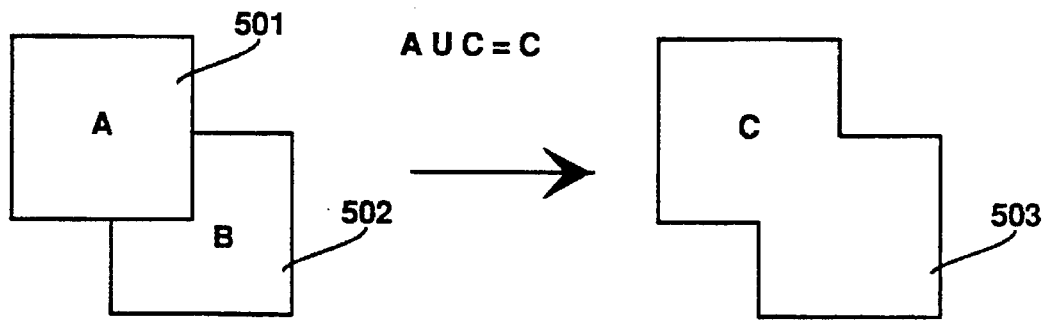
FIG. 5a–5c illustrate boolean set operations as may be utilized by the preferred embodiment of the present invention.
Figure 5B:
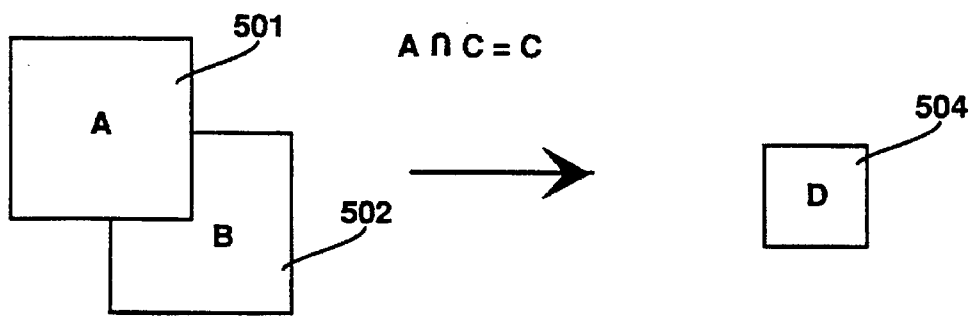
Figure 5C:
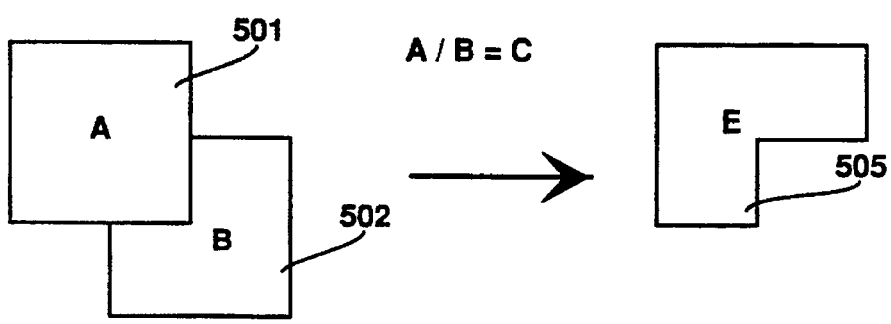

Boolean Set Operations are used to create a new solid or redefine an existing solid based on a relationship between two existing solids. Such Boolean Set Operations are described in the publication "An Introduction to Solid Modeling", Mantyla, Computer Science Press, 1988. FIGS. 5a–5c illustrate the effect of the Boolean Set Operations on pairs of objects in the preferred embodiment. FIGS. 5a–5c are 2-D illustrations, but it would be apparent to one skilled in the art to know that the same boolean set operations would work on 3-D solids of arbitrary shape. As such boolean set operations are known in the art, it is not necessary to describe how the function is performed, rather what is of interest is their effect.

Referring to FIG. 5a, a union operation is illustrated. A solid 501 A and a solid 502 B are combined using the union operation to create the redefined solid illustrated as 503 C. It should be noted that in the union operation, the resulting solid is comprised of the entire area defined by the solids 501 A and 502 B. The redefined solid 503 C is a single solid which occupies the same space.

FIG. 5b illustrates an intersection operation. When solid 501 A is intersected with solid 502 B the result is the redefined solid is 504 D. The intersection operation creates a redefined solid which is comprised of only those points which are common to both the solid 501 A and 502 B.

FIG. 5c illustrates the Boolean Difference Operation. When determining the Boolean Difference of solid 502 B from solid 501 A the redefined solid 505 E is the area of solid 501 A that is not common with solid 502 B.

As noted above with respect to FIG. 4, the simulation steps of the preferred embodiment are primarily comprised of the construction of trajectory solids followed by their combination with a material object solid.

Internal Representation and Data Structure of Solids

The material and trajectory solids of the preferred embodiment are represented as polyhedrons. It is known in the art of 3-D graphics, to represent solids as polyhedrons in order to provide sufficient information for such functions as hidden surface removal. A polyhedron representation is typically constructed from a collection of 2-D polygons, where one or more polygons comprise a face of the polyhedron.

Figure 6:
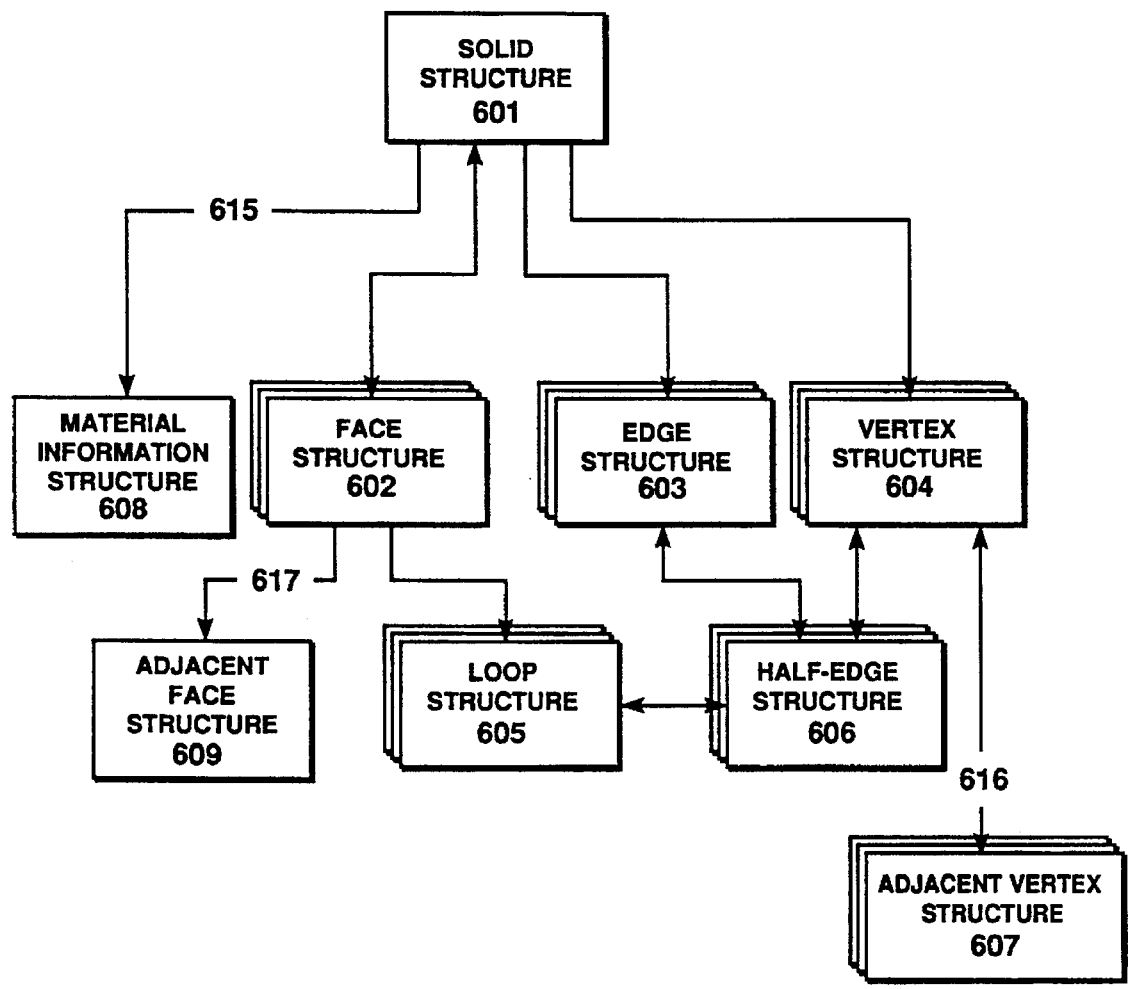
FIG. 6 illustrates a half-edge data structure as may be utilized by the preferred embodiment of the present invention.

The polyhedrons are represented within the system of the preferred embodiment using a boundary representation model. The boundary representation model as utilized in the preferred embodiment is termed a half-edge model and is described in the publication "An Introduction to Solid Modeling", Mantyla, Computer Science Press, 1988 (a definition of the basic data structures in the C programming language is provided at pages 163-170). In any event, FIG. 6 illustrates the basic data structure and extensions to the basic data structure of a solid in the preferred embodiment. An object is defined in terms of a hierarchy of structural elements. The basic structural elements defined in the preferred embodiment, include a solid structure 601, a face structure 602, an edge structure 603, a vertex structure 604, a loop structure 605, and a half edge structure 606. The solid structure 601 is primarily an entry point to other structural elements. It contains a solid identifier and a plurality of pointers to lists of the primitive structural elements defining the solid. It should be noted that pointers are well known data types used for referencing data. Thus, no further description of pointers is deemed necessary.

For any solid, there will be a plurality of face structure elements defined. The face structures 602 organized as a doubly linked list. The face structure 602 contains pointers to the solid structure, an outer loop, previous and subsequent faces and to a list of loops. The outer loop defines the outer boundary of the face structure. The face structure 602 as defined in the Mantyla reference was supplemented to include a pointer 617 to an adjacent face structure 609 in an adjacent solid. It should be noted that the adjacent face structure 609 will have a pointer back to the face structure 602. Such a corresponding face may result when, for example, one material is deposited onto another material.

The edge structure 603 contains pointers to half-edge structures 606. It should be noted that an edge consists of two half-edges. Assuming an edge between vertex points A and B, a first half-edge is defined as an edge running from A to B. A second half-edge is defined as an edge running from B to A. The need for distinguishing the types of half-edges will become more apparent in the description of loops.

The vertex structure 604 contains coordinates for vertex points with respect to a coordinate system and a pointer to a corresponding half-edge, of which the vertex is an endpoint, a subsequent vertex and a previous vertex. Like the face structure 602, the vertex structure 604 has been supplemented to contain a pointer 616 to an adjacent vertex structure 607. The adjacent vertex structure 607 is a list of vertex points and corresponding solid identifier.

The loop structure 605 contains a pointer to a list of half-edges, a previous loop, a subsequent loop and the face containing the loop. Two types of loops exist; inner loops and outer loops. As noted above, outer loops define the outer boundary of a face. An outer loop lists the half-edges defining the outer loop in a clockwise order. Inner loops define holes within the face. An inner loop lists the half-edges defining the inner loop in a counter clockwise order. As is apparent from the contents of the loop structure, loops are maintained in doubly-linked lists. This provides for easy traversal within a list of loops.

The half-edge structure 606 contains pointers to a parent edge, a vertex, the loop in which the half-edge is contained, a previous half-edge and a subsequent half-edge. The half-edge structures are maintained as a doubly-linked list.

Finally, a material information structure 608 has been provided which contains information that is used in determining solid objects surface movement. The solid structure 601 contains a pointer 615 to the material information structure 608.

The added structures and pointer types have no impact on the solid modeling operations. This is because the pointers can be reconnected after a deformation calculation is performed. Therefore, the known solids modeling operations can be used without modifications.

Example of a Multimaterial/multilayer Topography Representation

Figure 7A:
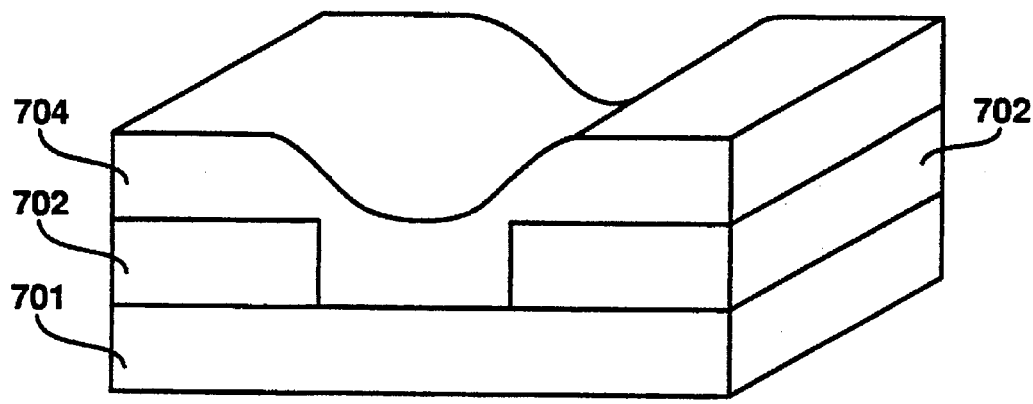
FIGS. 7a and 7b illustrate a multilayer/multimaterial wafer construct as may be simulated within the preferred embodiment of the present invention.
Figure 7B:
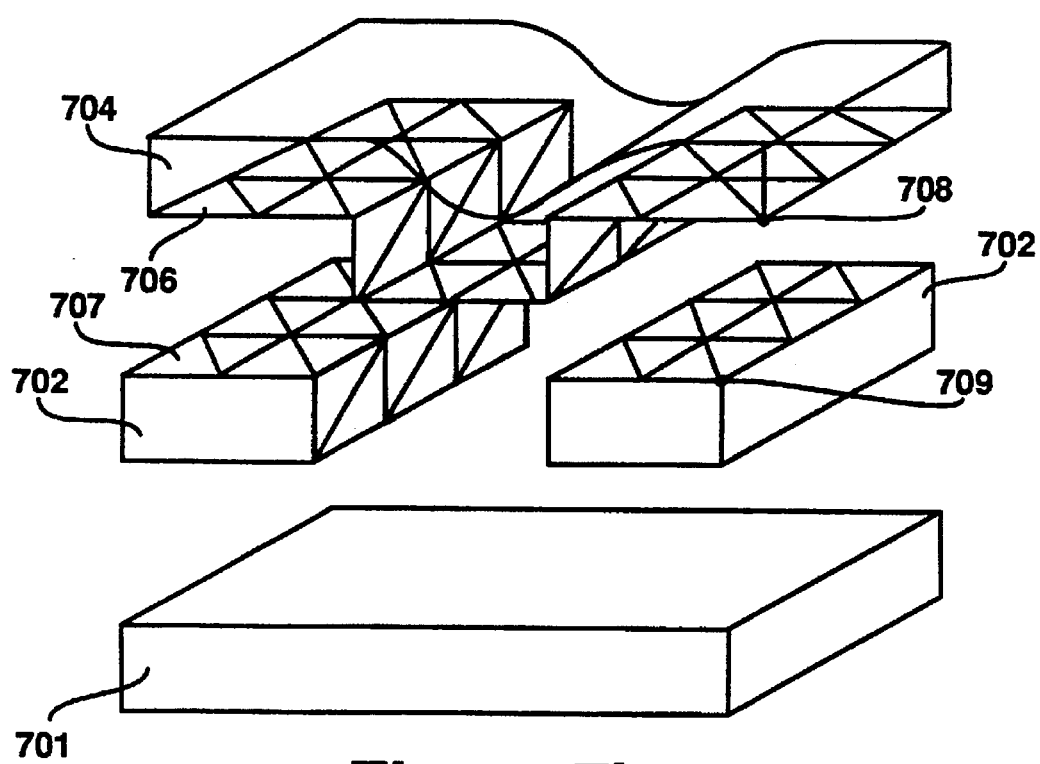

FIGS. 7a and 7b illustrate a multimaterial/multilayer topography representation. FIG. 7a shows the structure with all the materials connected as would occur on a typical wafer. In FIG. 7a, a silicon solid 701 is a base layer, an oxide solid 702 is a second layer through which a hole is defined for metal layer 704 to come in contact with silicon solid layer 701. Note that the second layer, i.e. the oxide layer, is actually comprised of multiple solids. Thus, any particular layer of material may be comprised of one or more solid structures. Referring now to FIG. 7b, an exploded illustration of the structure of the semiconductor wafer is illustrated. FIG. 7b illustrates the relationship between adjacent materials as provided in the preferred embodiment data structure. First, the metal solid 704 defines a face 706 which is adjacent to a face 707 of oxide solid 702. Further, the oxide solid 704 defines a vertex point 708 which is adjacent to a vertex point 709 defined by the oxide layer 702. It should be noted that since each of these structures is 3-dimensional, a vertex point may have more than one adjacent vertex point.

It should also be noted that the adjacent faces and vertices on metal solid 704 and oxide solid 702 are geometrically identical. It is necessary that the adjacent faces and vertices be geometrically identical in order for the data structure to be self-consistent.

Grid Adjustment and Triangulation

In the preferred embodiment, in the case where spatially varying deposition or etch is being performed, a surface of a solid must be comprised of triangle faces. The reason for this will become apparent below in the description of surface movement. The solid modeler of the preferred embodiment creates solids which have surfaces that are comprised of polygon faces. This is typical for most solid modelers. Thus, a triangle face generation (grid generation) method is provided.

Figure 8A:
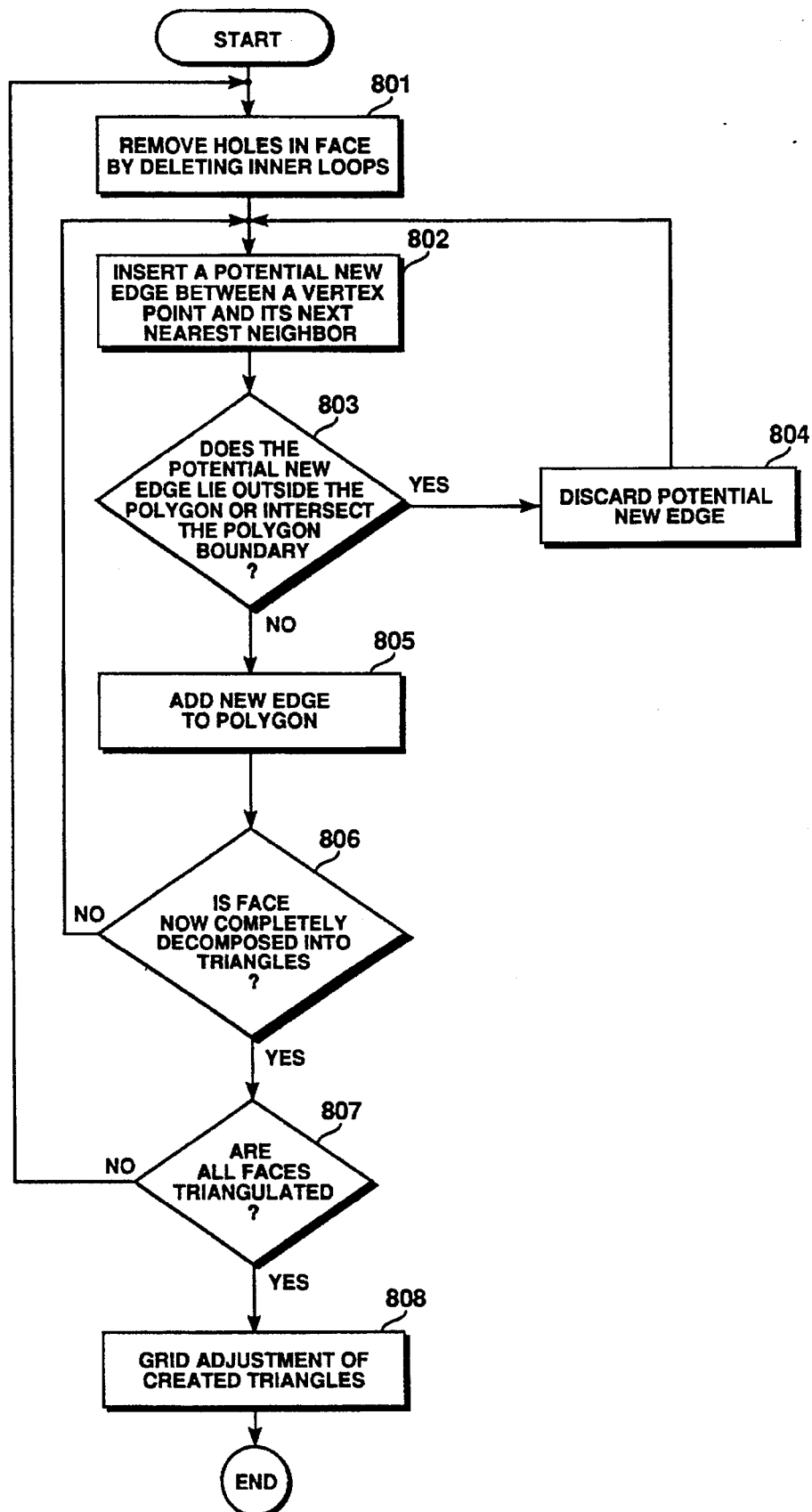
FIG. 8a is a flowchart outlining the steps for triangulation of polygonal faces of material solids as may be utilized within the preferred embodiment of the present invention.

Methods for creating triangular faces from polygons are known in the art, e.g. Delauney tesselation. However, the method of the preferred embodiment is much simpler than those known in the art. FIG. 8a is a flowchart of the basic method. First, any inner loops which construct holes in the solid are deleted, step 801. Deletion is performed by inserting new edges between two vertexes belonging to the outer and inner loops, respectively. It has been determined that initial deletion of such inner loops simplifies subsequent processing.

New edges are then inserted between a vertex and it's next nearest neighbor of the polygon surface being processed, step 802. It must then be determined if the new edge lies within the polygon or is within the boundary defined by the polygon surface, step 803. If the new edge lies outside the polygon or is not within the boundary defined by the polygon surface, the potential new edge is discarded, step 804, and a new potential edge is inserted via step 802. If the potential new edge is within the boundary defined by the polygon surface, the new edge is added to the polygon, step 805. The steps 802–806 essentially cause the the polygon faces to be divided into triangle faces. Next, it is determined if all faces have been triangulated, step 807. If not, steps 801–806 are repeated for the next face. If all faces have been triangulated, grid adjustment is performed, step 808.

Figure 8B:
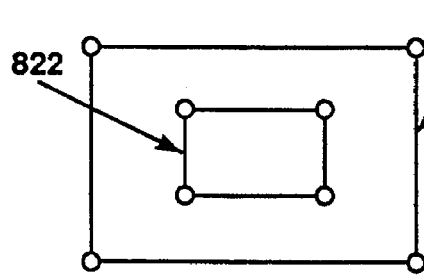
FIGS. 8b–8f illustrate the triangulation of a polygon square as may be utilized within the preferred embodiment of the present invention.
Figure 8C:
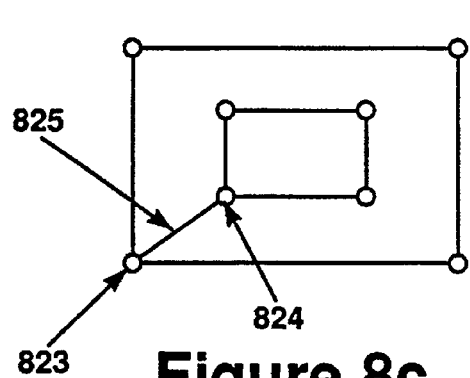

FIGS. 8b–8f provide an example of the triangulation method. Referring to FIG. 8b, a polygon face has an outer loop 821 and an inner loop 822. As described above, a loop structure is a doubly-linked list that contains a pointer to a ring of half-edges. As noted above, inner loops are deleted by inserting a new edge between a vertex point of the outer loop and a vertex point of the inner loop. Such a deletion of an inner loop is illustrated in FIG. 8c. Here, a new edge 825 has been inserted between the vertex point 823 of outer loop 821 and vertex point 824 of inner loop 822. This has the effect of including the half-edges defined by the inner loop within the ring of half-edges of the outer loop.

As described above, an edge structure is comprised of two half-edges. Thus new edge 825 is comprised of two half-edges. The reason for inserting half-edges is to facilitate the creation of new polygon faces (whose outer loop is comprised of a ring of half-edges). When a new polygon is created, one of the half-edges goes with the new polygon and one remains with the existing polygon.

Figure 8D:
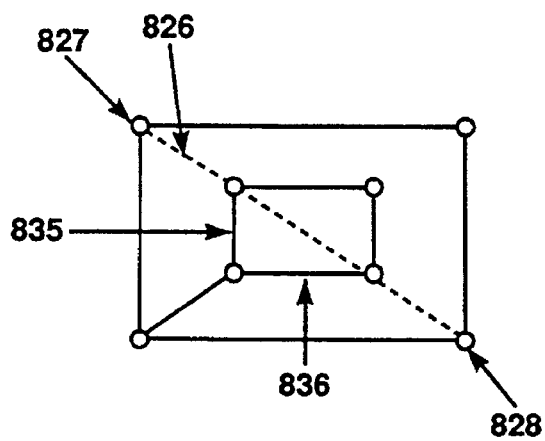

Referring now to FIG. 8d, a new edge 826 has been inserted between the vertex points of the polygon, here vertex points 827 and 828. In order for the new edge to remain, it must be determined that the new edge does not intersect the boundary of the polygon (i.e. the outer loop). As the outer loop now includes the half-edges of the inner loop, the new edge 826 intersects the half-edges 835 and 836. As the new edge 826 intersects the polygon boundary, the new edge 826 is discarded.

Figure 8E:
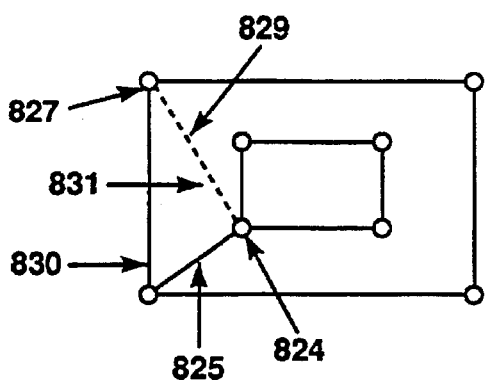
Figure 8F:
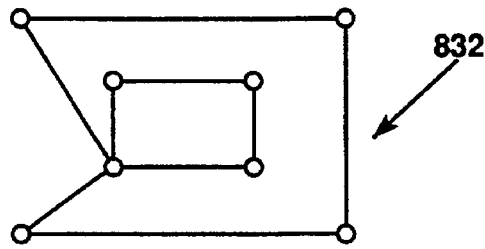

Referring now top FIG. 8e, a second new edge 829 is inserted between vertex points 827 and 824. Here, the new edge 829 does not intersect any half-edge in the outer loop. Further, a triangle 831 is defined. The triangle 831 will be comprised of one of the half-edges defined by each of the edges 825 and 829 and the half-edge 830. The triangle 831 will itself become a polygon face and the the triangulation process will continue with the polygon 832 illustrated in FIG. 8f.

Grid adjustment provides for restricting the size of the triangles. In the preferred embodiment three conditions will cause a grid adjustment operation to occur. These conditions are: (1) an edge exceeds a maximum edge length, (2) an edge is shorter than a minimum edge length, or (3) a triangle has a height below a predefined minimum. FIG. 9a–9f illustrate the grid adjustment operations that will occur responsive to the above conditions.

Figure 9A:
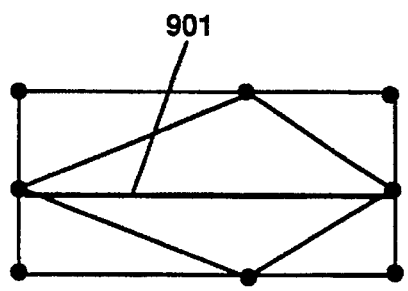
FIGS. 9a–9f illustrate grid adjustments that are made in the triangulation process of FIG. 8 as may be utilized within the preferred embodiment of the present invention.
Figure 9B:
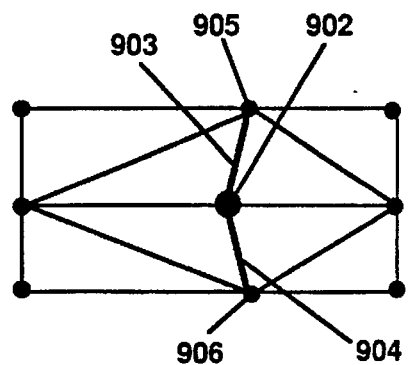

Referring to FIGS. 9a–9b, the case of a long edge is illustrated. Basically, the long edge is divided into two edges and two new edges are inserted, thus creating two additional triangles. In FIG. 9a, the edge 901 is of excessive length. In the preferred embodiment, if the edge length exceeds 160% of the nominal triangle size, it is excessive. Note that the nominal triangle size is provided as input to the process simulation. It would not depart from the spirit and scope of the present invention to choose a different edge length tolerance as excessive. FIG. 9b shows the corrective action taken. First, a new vertex point 902 is inserted at the middle point of edge 901. Next new edges 903 and 904 are created by connecting the new vertex point 902 and neighboring vertex points 905 and 906. The vertex points 905 and 906 are selected since they are points that were previously used to define triangles defined by the edge 901.

Figure 9C:
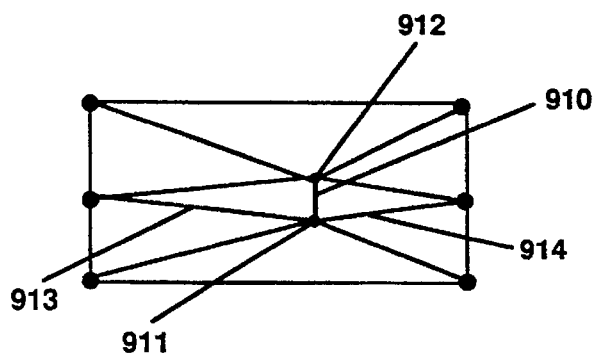
Figure 9D:
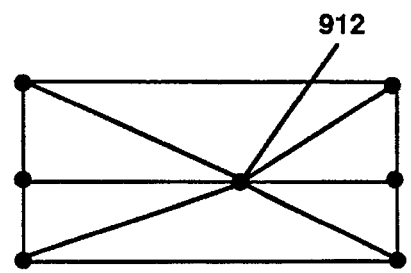

Referring to FIGS. 9c–9d, the case of a short edge is illustrated. Basically, the short edge is deleted and along with edges used to create a triangle. In FIG. 9c, the edge 910 is too short in length. In the preferred embodiment, if the edge length is not at least 60% of the nominal triangle size it is to short. It would not depart from the spirt and scope of the present invention to choose a different edge length threshold as a minimum. Further illustrated in FIG. 9c are vertex points 911 and 912 and edges 913 and 914. FIG. 9d shows the corrective action taken. First, the short edge 910 is deleted. This has the effect of deleting one of the vertex points, i.e. point 911, as well as two edges, i.e. edges 913 and 914 (illustrated in FIG. 9c). The vertex 912 then becomes a vertex for the triangles that previously included vertex 911.

Figure 9E:
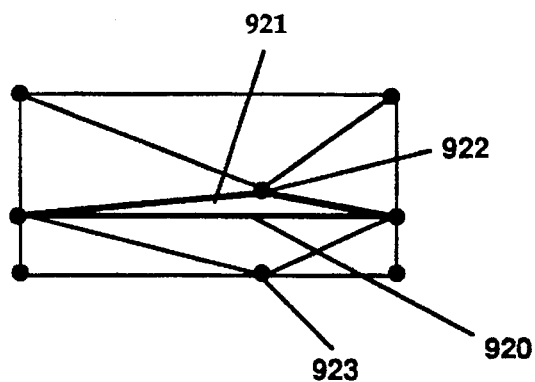
Figure 9F:
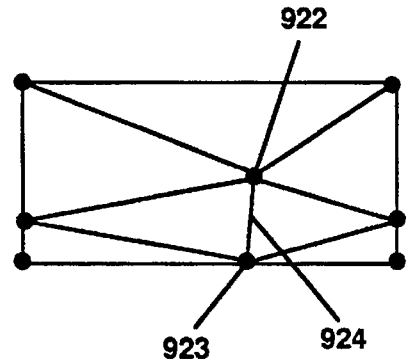

Referring to FIGS. 9e–9f, the case of a triangle with a short height is illustrated. Basically, one edge is deleted while another is inserted. In FIG. 9e, the height of the triangle 921 is below a minimum. In the preferred embodiment, if the height of a triangle is not at least 28% of the nominal triangle size, the height is too short. It would not depart from the spirt and scope of the present invention to choose a different height-threshold as a minimum. Further illustrated in FIG. 9e are vertex points 922 and 923 and edge 924. FIG. 9f shows the corrective action taken. First an edge of the triangle is deleted. Here the edge 920 has been deleted. In the preferred embodiment, the longest edge will be deleted. Next, a new edge 924 is connected between two other vertex points, here vertex points 922 and 923. The vertex points between which to create the new triangles is determined by examining vertex points associated with the triangles of the deleted edge.

These rules are repeatedly performed in the following order: 1) divide long edge, 2) delete short edges and 3) delete and insert edge for short triangles; until all conditions are satisfied, or until a specified maximum number of repetitions have been attempted.

Throughout this process, additional vertex, face and half-edge structures will be created for the solids structure. Additionally, adjacent vertex and face structures will be created. Creation of such structures and integration into the existing solids structure is known in the art.

Overview of Solid Surface Movement

As described above, in the preferred embodiment a semiconductor wafer is represented as a collection of object solids, where each object solid represents a different material. During the manufacturing process, the topography of the semiconductor wafer is changed through the deformation (i.e. growing and shrinking) of portions of these object solids. This step of growing and shrinking an object solid is termed solid surface movement. Trajectory solids are defined as the locus of etch or growth trajectories, emanating from a vertex, edge or face. Trajectory solids are represented by a 3-D solid in which the surface is given by the endpoints of the trajectories. In the preferred embodiment the amount of growth or shrinkage is defined in terms of the size and shape of the trajectory solids. The original material object solid is combined with the trajectory solids, using boolean set operations, to create a redefined material object solid.

Figure 10A:
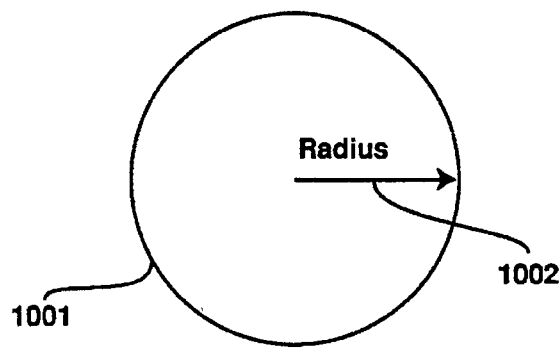
FIGS. 10a–10c illustrate trajectory solids as may be utilized by the preferred embodiment of the present invention.
Figure 10B:
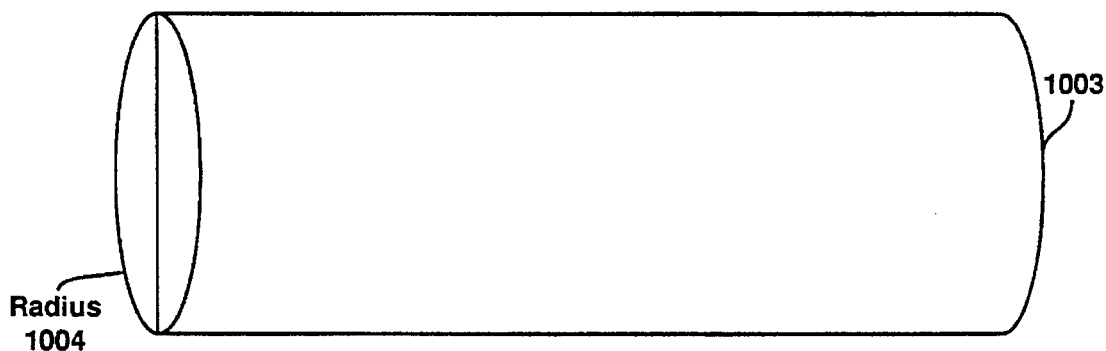
Figure 10C:
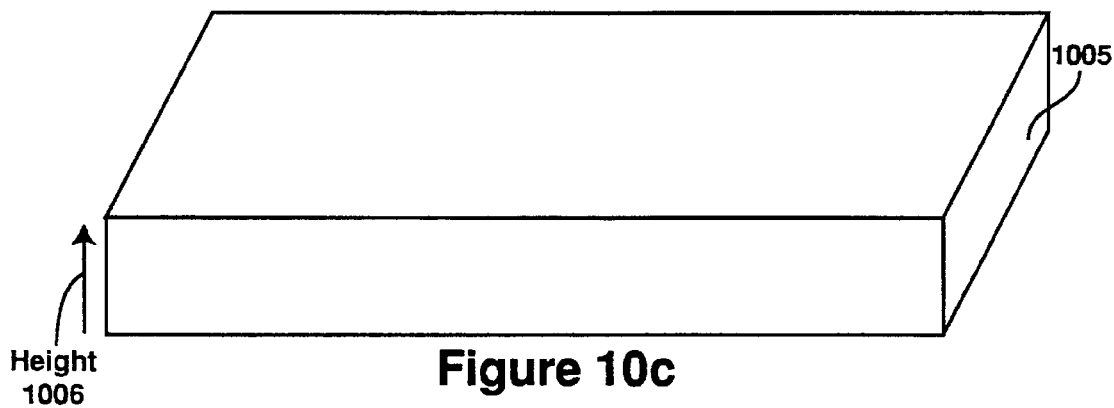

FIGS. 10a–10c illustrate trajectory solids utilized by the preferred embodiment. The locus of growth or etch trajectories from a vertex is considered to form a sphere (or an ellipsoid in the case of differing vertical and horizontal etch rates). FIG. 10a illustrates such a trajectory solid sphere 1001 with a radius R 1002. The radius R 1002 corresponds to the isotropic or anisotropic etch or deposition rate for the particular process step being simulated.

The locus of trajectories from an edge forms a cylinder, which may be distorted in the case of differing vertical and horizontal etch rates. FIG. 10b illustrates such a cylinder 1003 with a radius R1004. The radius R 1004 corresponds to the etch or deposition rate for the particular process step being simulated.

The locus of trajectories of a surface face forms a parallelopided (or a "slab"). FIG. 10c illustrates such a slab 1005 with a height H 1006. The height H 1006 corresponds to the etch or deposition rate for the particular process step being simulated.

Representation and construction of the trajectory solids is described in more detail below.

Deposition Using Boolean Set Operations

FIGS. 11 and 12a–12i outlines the steps required and exemplify the effect of a deposition process step. In the deposition case, the redefined material solid is defined as:

Redefined material solid=Initial material solid U Trajectory solids.
(Boolean Union Operation)

Figure 11:
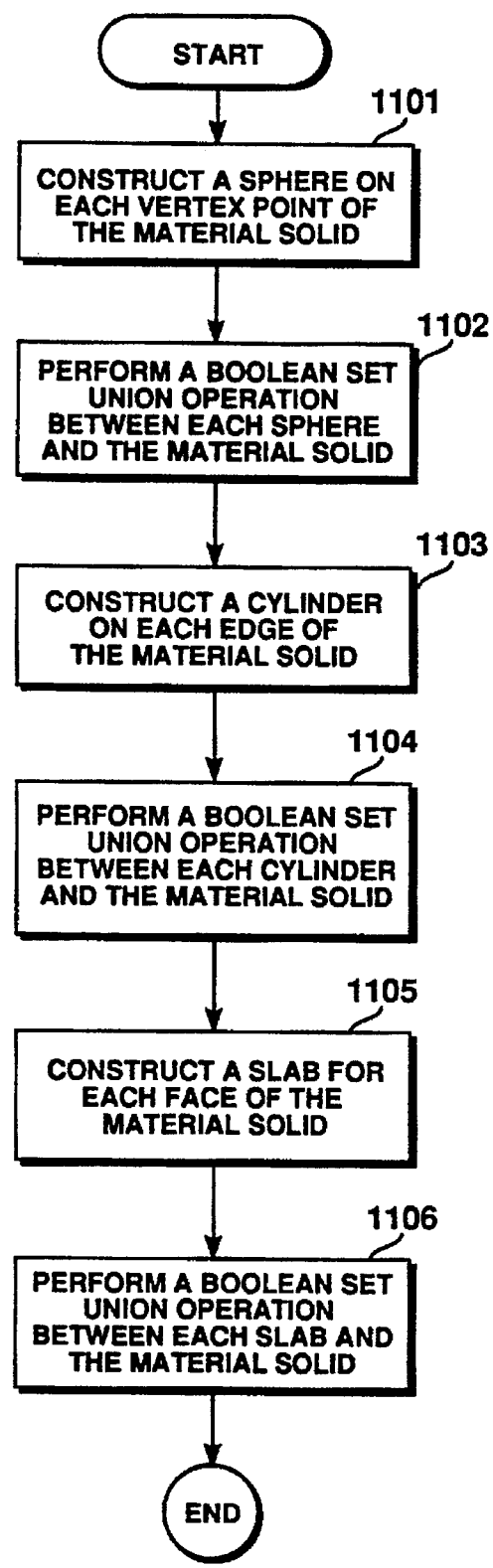
FIG. 11 is a flowchart of a deposition example as may be performed in the preferred embodiment of the present invention.
Figure 12A:
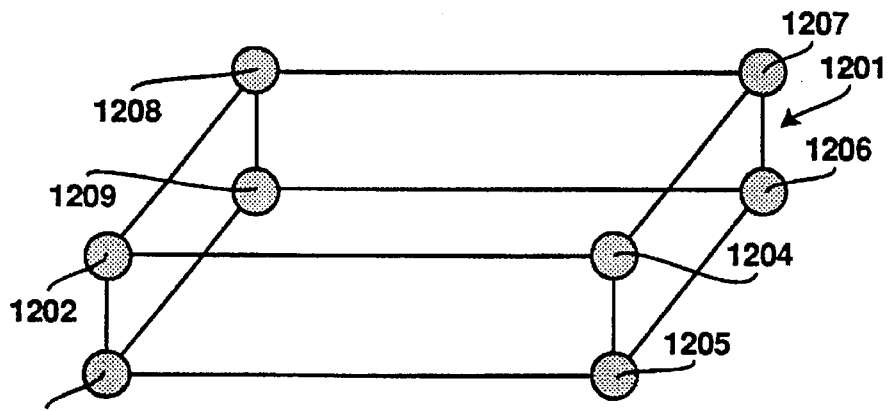
FIG. 12a–12i illustrate material solids and trajectory solids in a deposition example, as may be utilized within the preferred embodiment of the present invention.
Figure 12B:
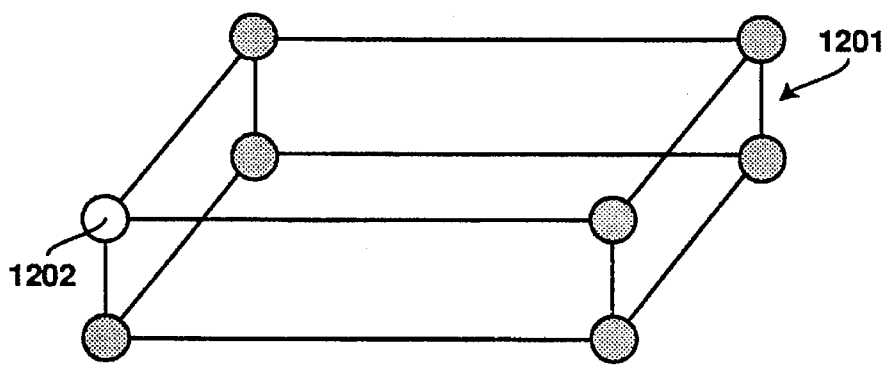
Figure 12C:
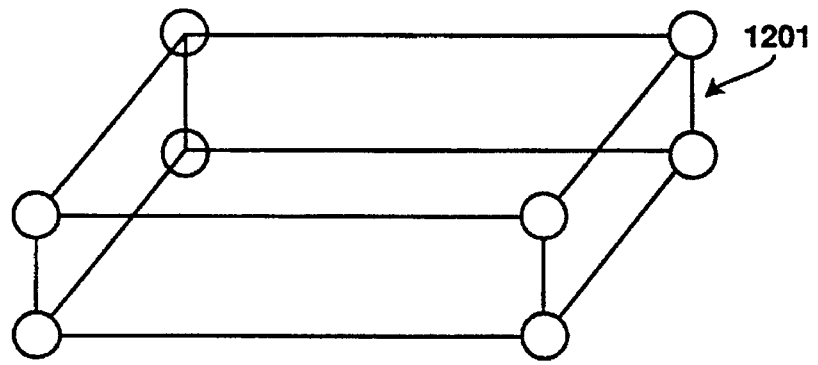

Referring to FIG. 11, a sphere is constructed on each vertex point of the object solid, step 1101. This step is illustrated in FIG. 12a. In FIG. 12a, the object solid 1201 has a sphere created on each vertex point, i.e. spheres 1202–1209. As noted above, the radii of each of the spheres 1202–1209 is equal to the deposition rate. It should be noted that a sphere at the vertex points will cause a more accurate simulation of the true effects of deposition at points where edges intersect at right angles. In any event, a boolean union operation is performed for each sphere with the material solid, step 1102. This step is illustrated in FIG. 12b, where material solid 1201 has been redefined to include sphere 1202. Finally, in FIG. 12c the material solid 1201 has been redefined to include all of the spheres 1202–1209. Note that the construction of a sphere on a vertex point, i.e. step 1201, will be described in greater detail below.

Figure 12D:
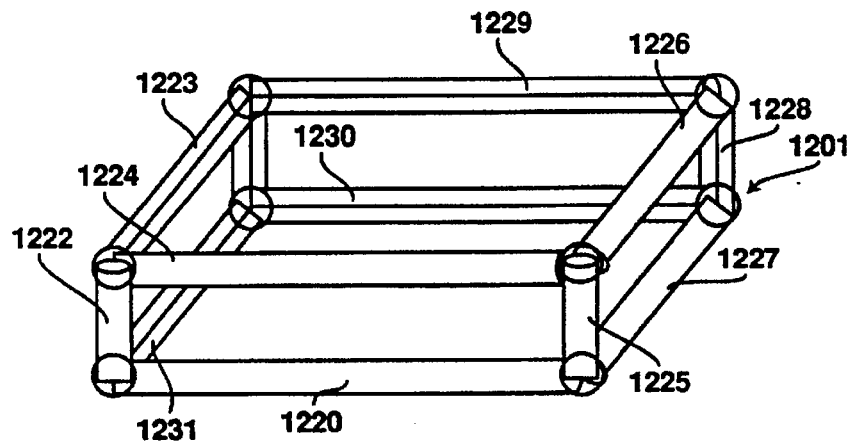
Figure 12E:
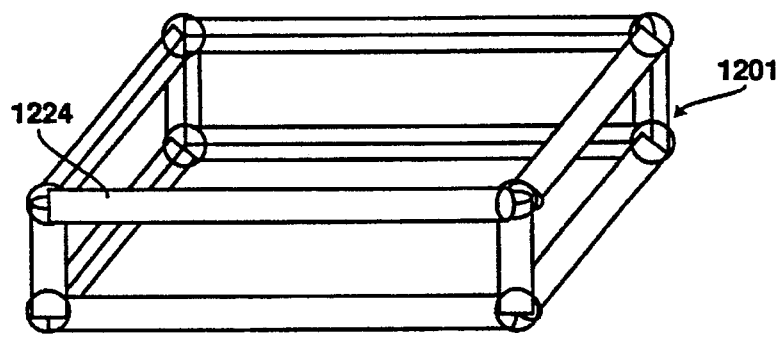
Figure 12F:
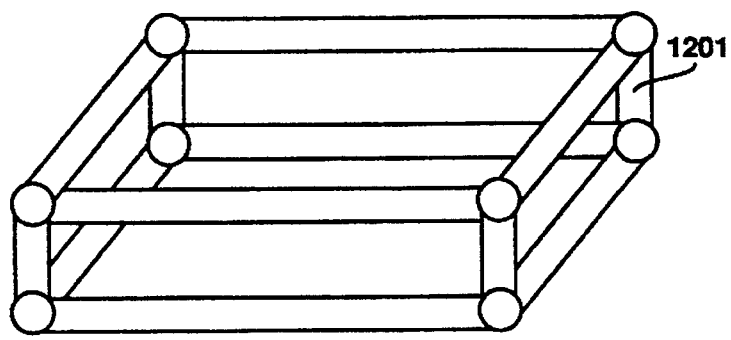

Next, a cylinder is constructed on each edge of the material solid, step 1103. This is illustrated in FIG. 12d, where cylinders 1220–1231 are illustrated. The construction of cylinders in the preferred embodiment is discussed in greater detail below. Next, a boolean union operation is performed with the material solid and each of the cylinders, step 1104. This is illustrated in FIG. 12e, where material solid 1201 has been redefined to include cylinder 1224. Finally, as illustrated in FIG. 12f, material solid 1201 has been redefined to include all of the cylinders.

Figure 12G:
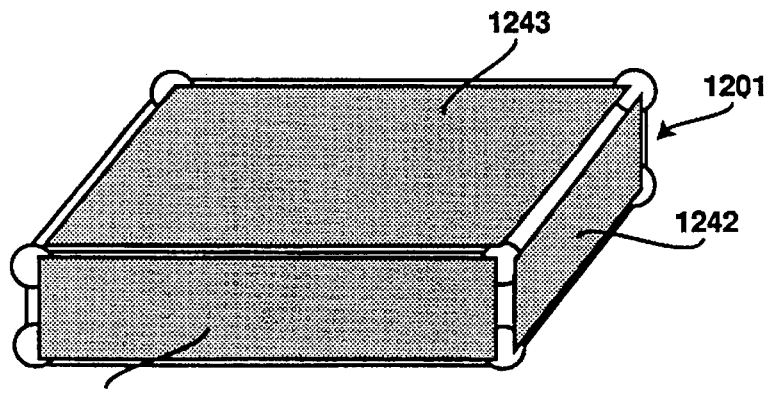
Figure 12H:
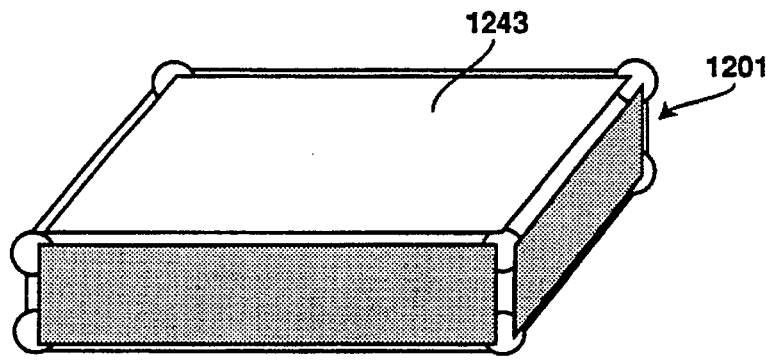
Figure 12I:
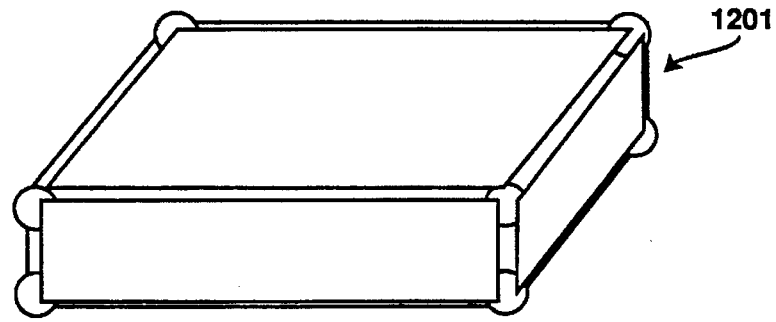

For each face of the material solid a slab is constructed, step 1105. The construction of slabs in the preferred embodiment is discussed in greater detail below. FIG. 12g shows slabs 1241, 1242, and 1243 on the faces of the material solid 1201. Next, a boolean union operation is performed with each slab and the material solid, step 1106. Such union operations are illustrated in FIG. 12h and 12i. In FIG. 12h, the material solid 1201 has been redefined to include the slab 1243. In FIG. 12i, the material solid 1201 has been redefined to include all the slabs 1241, 1242, and 1243. It should be noted that in FIGS. 12g–12i, that all of the slabs have not been illustrated, as the material solid has three (3) other faces that are not visible. In the preferred embodiment, there are slabs corresponding to each of these non-visible faces.

Etching using Boolean Set Operations

In the etching case, the redefined material solid after the deformation process is calculated as:

Redefined material solid=Original material solid–Trajectory Solid
(Boolean Difference)

Figure 13:
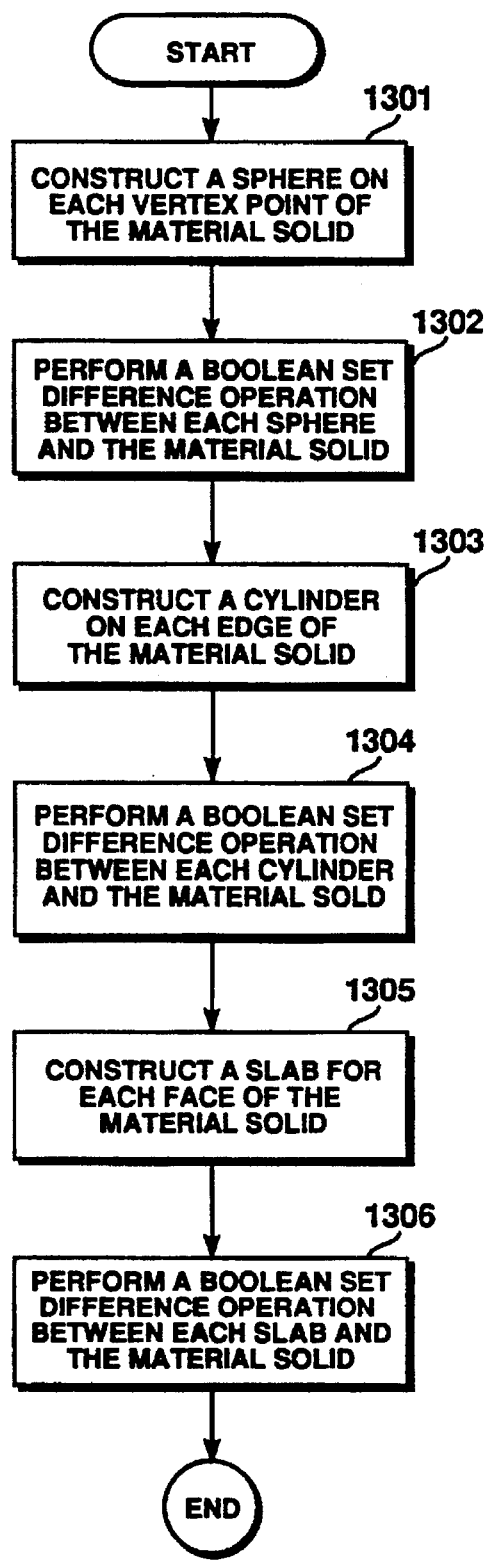
FIG. 13 is a flowchart of an etch example as may be performed in the preferred embodiment of the present invention.
Figure 14A:
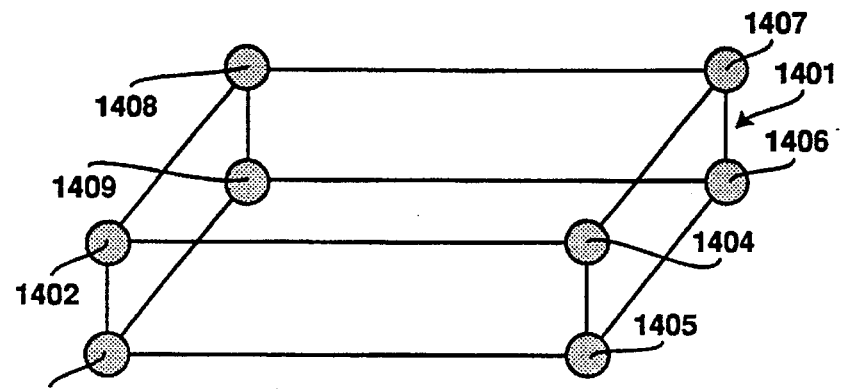
FIG. 14a–14h illustrate material solids and trajectory solids in an etch example, as may be utilized within the preferred embodiment of the present invention.
Figure 14B:
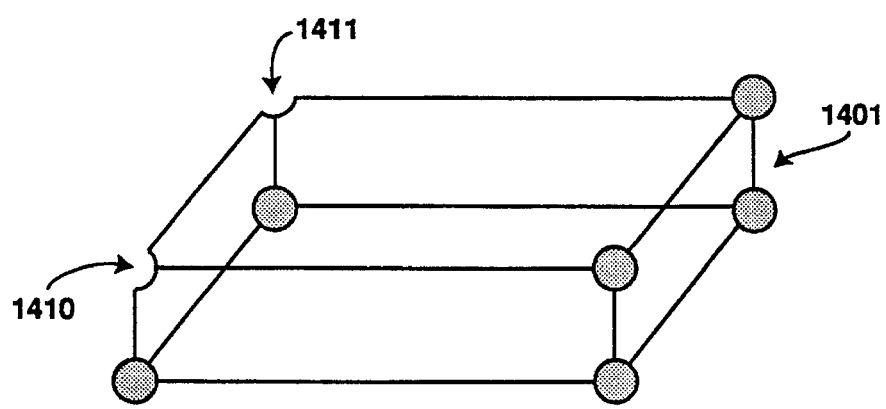
Figure 14C:
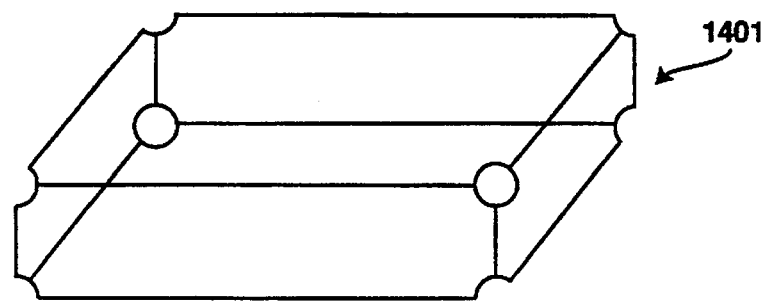

The steps for an etch process is illustrated in FIG. 13. First, a sphere is constructed on each vertex point of the material solid, step 1301. This is illustrated in FIG. 14a, where spheres 1402–1409 are constructed on the vertex points of the material solid 1401. Next, the boolean difference operation for each sphere and the material solid, 1401 is taken, step 1302. This is illustrated in FIG. 14b, where material solid 1401 has been redefined having voids 1410 and 1411 where spheres 1402 and 1408 previously where located. Finally, FIG. 14c illustrates the redefined material solid 1401 having voids where each of the spheres 1402–1409 where previously located.

Figure 14D:
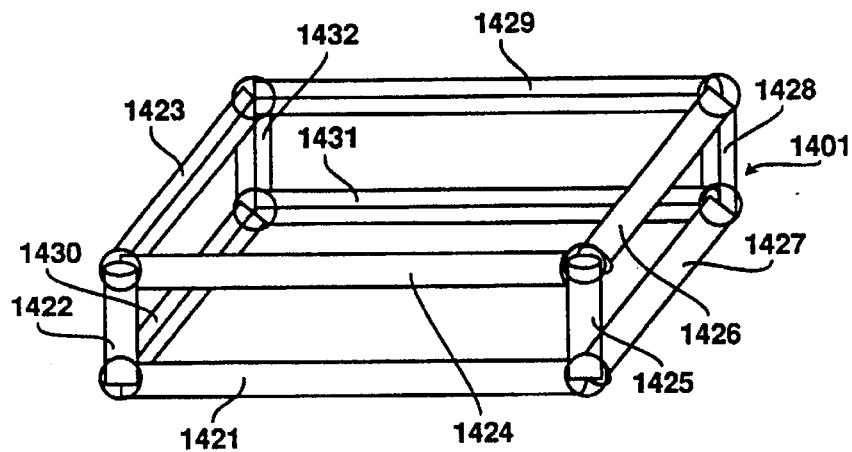
Figure 14E:
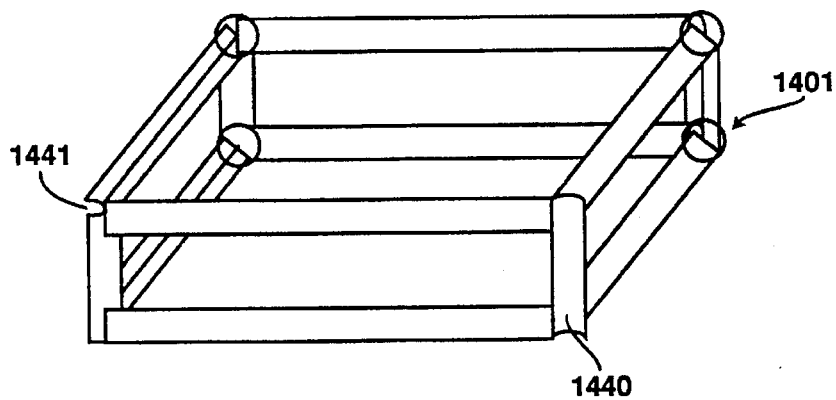
Figure 14F:
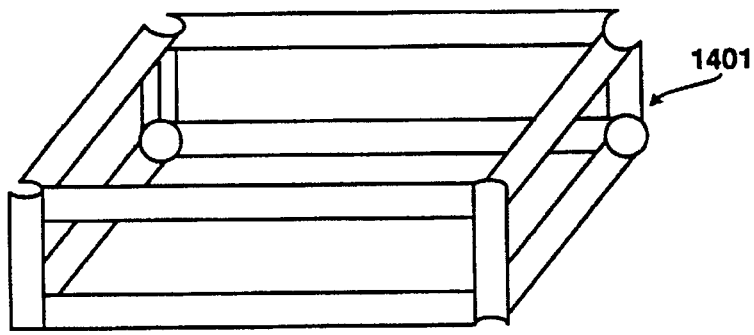

Next, a cylinder is constructed on each edge of the material solid, step 1303. This is illustrated in FIG. 14d where the cylinders 1421–1432 have been constructed on the material solid 1401. A boolean difference operation is then performed with each cylinder and the material solid, step 1304. This is illustrated in FIG. 14e where the material solid 1401 now has voids 1440 and 1441 defined where previously cylinders 1425 and 1422 were located. Finally, in FIG. 14f, the material solid 1401 has been combined with all of the cylinders 1421–1432 thus creating the resultant shape.

Figure 14G:
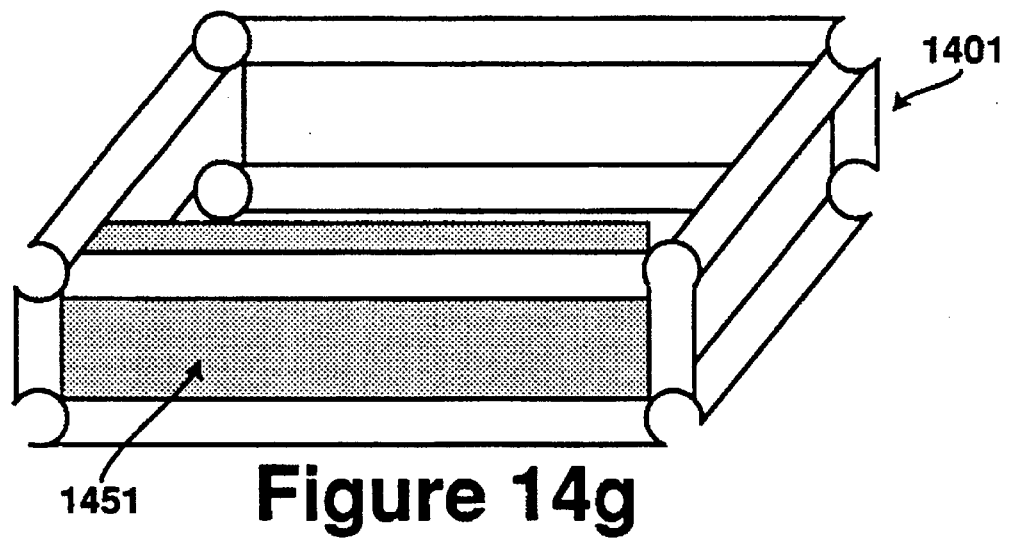
Figure 14H:
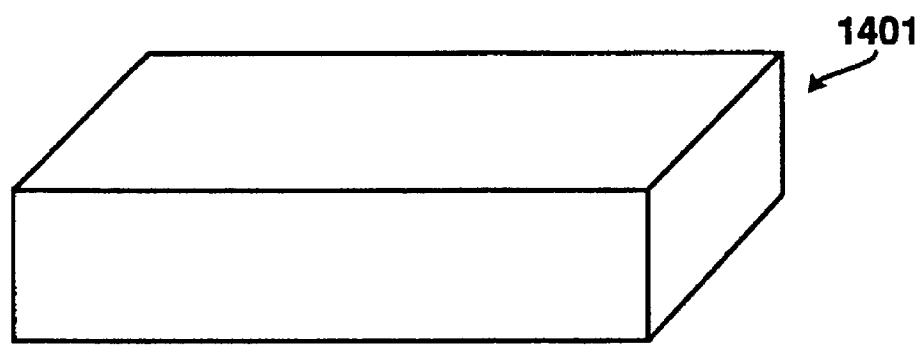

Next, a slab is constructed for each face of the material solid, step 1305. This is illustrated in FIG. 14g, where the slab 1451 has been constructed. A boolean difference operation is then performed with each slab and the material solid 1401. This would result in the material solid as illustrated in FIG. 14h.

Construction of Trajectory Solids

Figure 15:
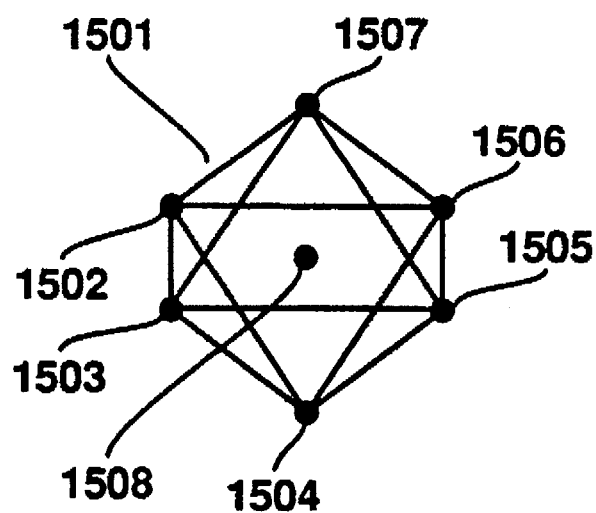
FIG. 15 is an octahedral representation of a sphere on a vertex point as may be utilized within the preferred embodiment of the present invention.

In the preferred embodiment, the trajectory solid will have a polyhedral representation which approximates the actual shape of the trajectory solid. However, it would not depart from the spirit and scope of the present invention to use other representations. As used in this context, a polyhedron is a representation of a solid object whose surface is defined by polygons. The choice of a particular polyhedron relates to the desired accuracy in the simulation. Generally, the more faces the polyhedron has, the more accurate the simulation. The reason for this will become readily apparent with respect to the construction of cylinders and slabs. FIG. 15 illustrates a sphere represented by an octahedron 1501. The octahedron has eight equilateral triangles defining the surface of the sphere and six vertex points 1502–1507. It should be noted that in the preferred embodiment any polyhedron may be used to represent a sphere. In general, it is possible to create a more accurate representation of a sphere by using a polyhedron with more faces. Further, illustrated in FIG. 15 is a vertex point 1508 of the solid object which the sphere is surrounding. The distance from the vertex point 1508 to any of the vertex points 1502–1507 is equal to the radius of the sphere. As noted above, the radius of the sphere, the radius of a cylinder, and the height of a slab are all related to the etch or deposition rate of the process step being simulated.

It should be noted that the sphere as a trajectory solid is utilized when the deposition or etching is isotropic. In the cases where the deposition or etching is not purely isotropic, an ellipsoid is used in place of the sphere. The shape of the ellipsoid would determine the deposition/etch rates in the horizontal/vertical directions. For example, if the vertical deposition rate is twice that of the horizontal deposition rate, the ellipsoid would be expanded in the vertical direction, so that its vertical axis would be twice its horizontal axis. This expansion can be accomplished by scaling the coordinates of the polyhedral representation of the sphere, using vertical and horizontal scaling factors proportional to the vertical and horizontal deposition rates.

In the preferred embodiment, any polyhedral representation of a sphere may be used. A sphere is typically a solid primitive of a solid modeler system which may be created by specifying a location and a radius.

Construction of Cylinders and Slabs as Trajectory Solids

For the construction of both a cylinder and a slab, rectangles are created to define the surface of the solid. It is apparent that either solid type may be readily constructed through the use of solid primitives. However, the use of a conventional solid primitive to construct, for example a cylinder, may create a solid structure with undesirable edges or many small faces and edges which could be formed at the intersection of the vertex trajectory solids with edge or face trajectory solids. These numerous small faces and edges are caused by the difference between the true, ideal sphere (or cylinder) and the polyhedral representation of the sphere (or cylinder). These numerous small edges and faces are undesirable for two reasons. First, although they add little to the accuracy of the result, they can substantially increase the computational burden of subsequent process steps. Second, an important application of the result the process simulations described here is the transfer of the simulated 3-D shaped to other programs for analysis (e.g. electrical, thermal, mechanical, etc.). The generation of a 3-D shape for such analysis programs is greatly complicated if the 3-D shape has numerous small edges and faces.

Figure 16A:
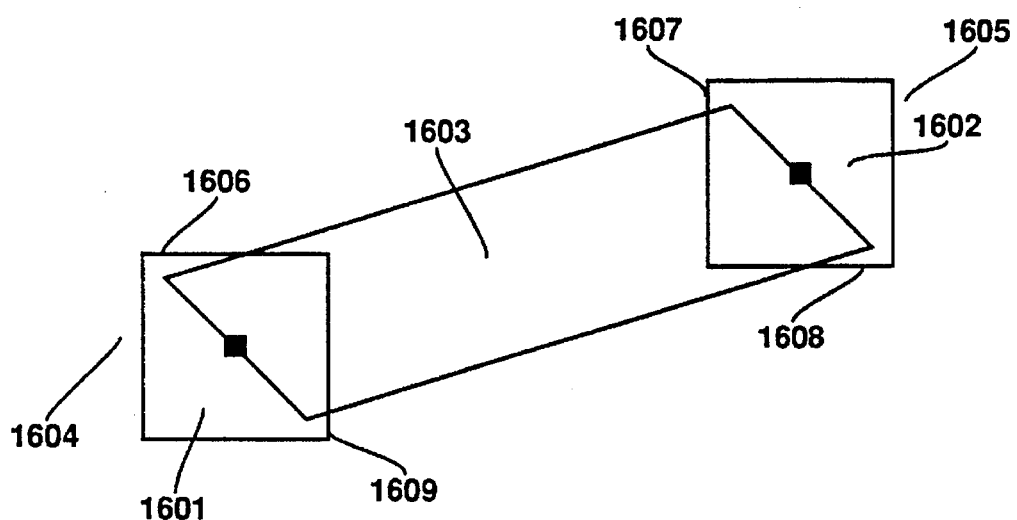
FIGS. 16a–16b illustrate the creation of small edges that would result absent the method of construction of trajectory solids as utilized within the preferred embodiment of the present invention.
Figure 16B:
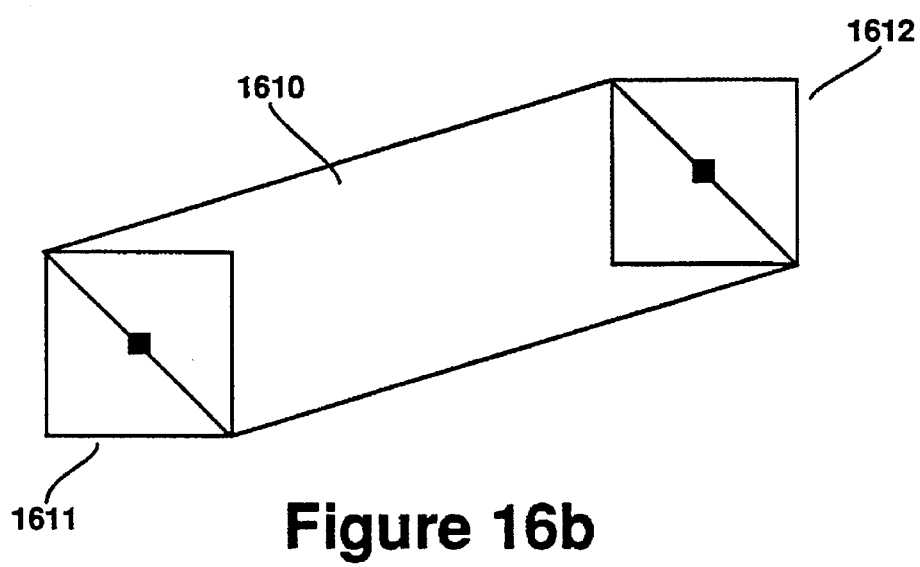

The method of constructing cylinders and slabs in the preferred embodiment, minimizes the number of small edges and faces that may be created in the final 3-D shape. The basic idea is illustrated in 2-D in FIG. 16a. Referring to FIG. 16a, squares 1601 and 1602 are used to represent vertex trajectory solids. An edge trajectory solid 1603 connecting and having the same radius of vertex trajectory solids 1601 and 1602 is created. The result may be the creation of unnecessary small edges at faces 1604 and 1605, e.g. edges 1606–1609. The method for constructing trajectory solids in the preferred embodiment will result in the construction of a solid as illustrated in FIG. 16b. Here, edge trajectory solid 1610 is constructed in a manner eliminating the creation of small edges at faces 1611 and 1612.

A tradeoff of the method of the preferred embodiment is that the actual radius of the cylinders may vary from the radius of the ideal cylinder. However, such a variation would be within the limits of the inaccuracy of the polyhedral representation of the sphere. This variation can be reduced to any desired value by choosing a sufficiently accurate polyhedral representation of a sphere.

Figure 17:
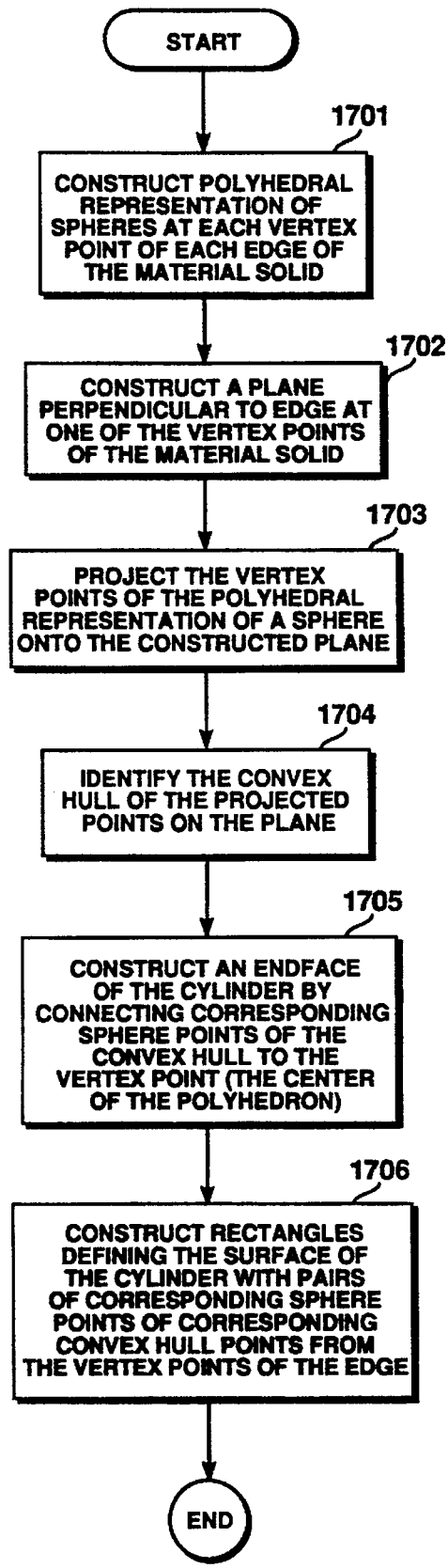
FIG. 17 is a flowchart of the steps for the construction of a cylinder as may be performed by the preferred embodiment of the present invention.
Figure 18A:
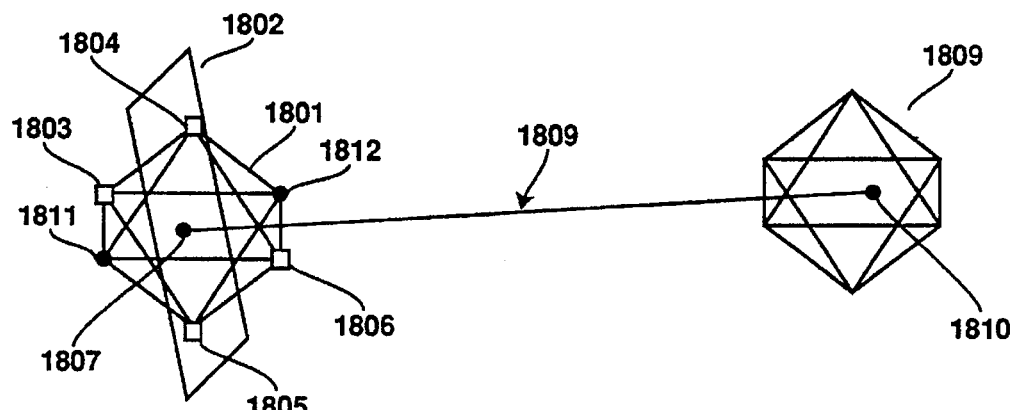
FIG. 18a–18c illustrates the construction of a cylinder as may be performed by the preferred embodiment of the present invention.
Figure 18B:
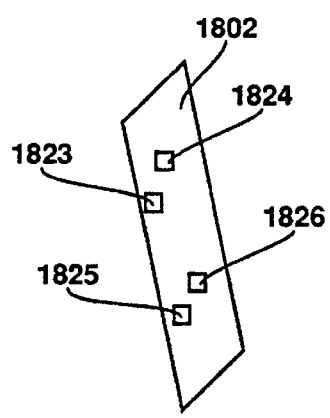

FIG. 17 is a flowchart outlining the steps of constructing a cylinder on an edge in the preferred embodiment. A first step is to construct a polyhedral representation of a sphere or ellipsoid at each vertex point of the edge of the material solid, step 1701. It is this polyhedral representation that will be used to construct a cylinder that has a good fit with respect to the vertices. Next, a plane perpendicular to the edge at one of the vertex points of the material solid is created, step 1702. The construction to this point is illustrated in FIG. 18a. An edge 1808 with vertex points 1807 and 1810 are surrounded by spheres 1801 and 1809, respectively. A plane 1802 is perpendicular to the edge 1808. Vertex points of the polyhedron representation of the sphere, are then projected perpendicularly onto the plane. This is illustrated in FIG. 18b. Here each of the points 1803–1806, 1811, and 1812 are projected onto the plane 1802. By projecting, what is meant is the determination of the point on the plane which is the intersection of a line which is perpendicular to the plane and which passes through the original point.

Referring again to FIG. 17, the convex hull of the projected points on the plane are identified, step 1704. Here the convex hull is in the 2-D sense, that is, the convex hull represents the outermost points on the plane. Referring to FIG. 18b, the convex hull points are identified as points 1823, 1824, 1825, and 1826 and represent the points that are the outermost points on the plane 1802. The point 1823 is projected from point 1803, the point 1824 is projected from point 1804, the point 1825 is projected from point 1805 and the point 1826 is projected from point 1806. Techniques for determining convex hull points are known in the art. One such technique involves an iterative process where each of the points is compared to a triangle formed by three other points. If the the point being tested is inside the triangle, it is not an outermost point. If the point being tested is outside the triangle, it has the potential to be an outermost point and the process is repeated with a triangle formed by three other points. This continues until either the point is found to be inside a triangle, or the point is found to be outside all possible triangles (wherein it is identified as an outermost point). The process will repeat until all the points have been tested. Such a technique is utilized in the preferred embodiment.

Figure 18C:
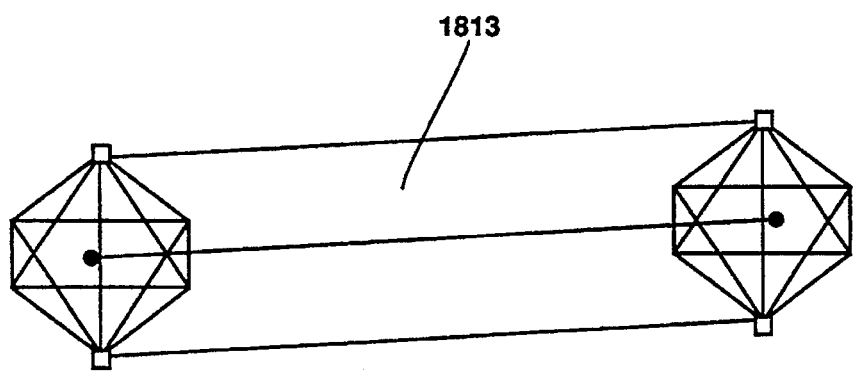

The end of the cylinder is then constructed, step 1705. Each convex hull point is associated with a corresponding point from which it was projected. The end of the cylinder is constructed by connecting the corresponding points to the center of the polyhedron 1801. This is done because the points corresponding to the convex hull points generally do not lie on a single plane. Finally, rectangles are created between the corresponding points of one end to the corresponding points of the other end. Rectangles are created successively around those points so that the rectangles define the cylinder boundary. This is illustrated in FIG. 18c where the area 1813 defines a rectangle between corresponding points of the two vertices.

Figure 19:
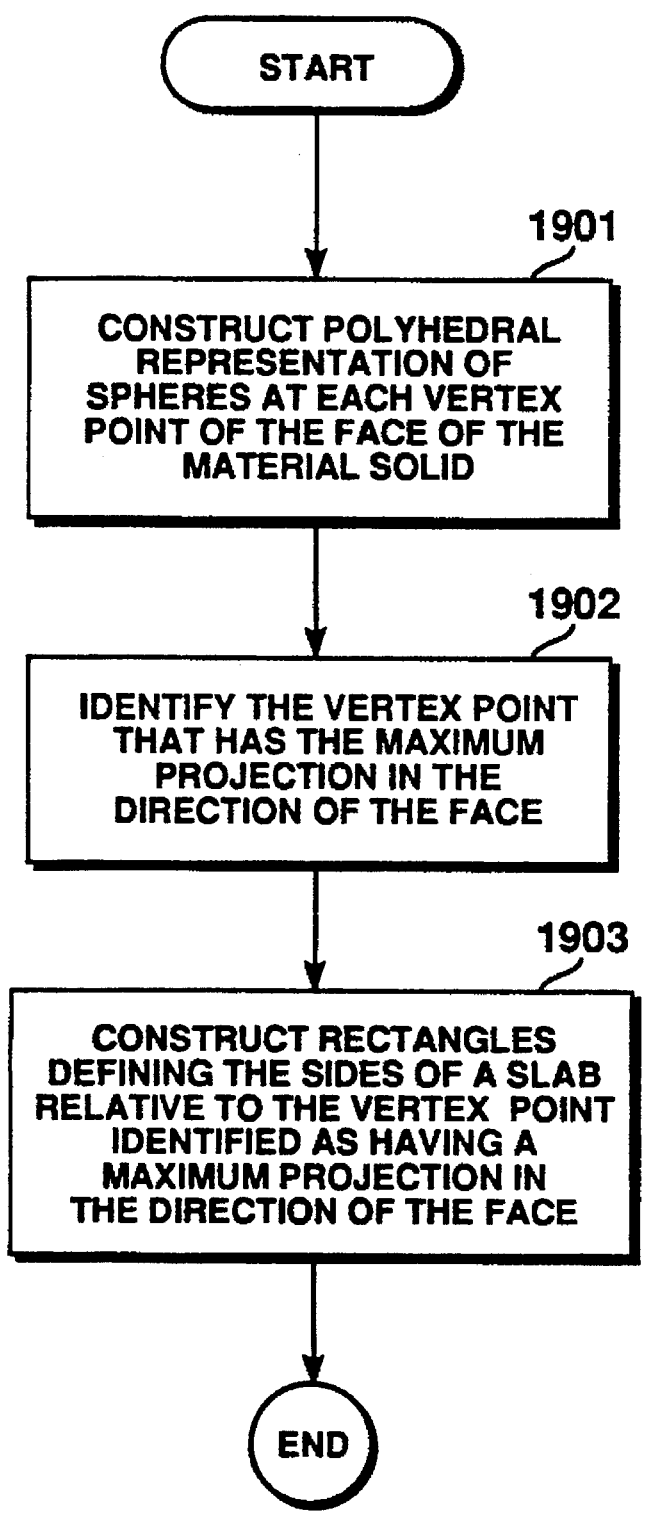
FIG. 19 is a flowchart of the steps for the construction of a slab as may be performed by the preferred embodiment of the present invention.
Figure 20:
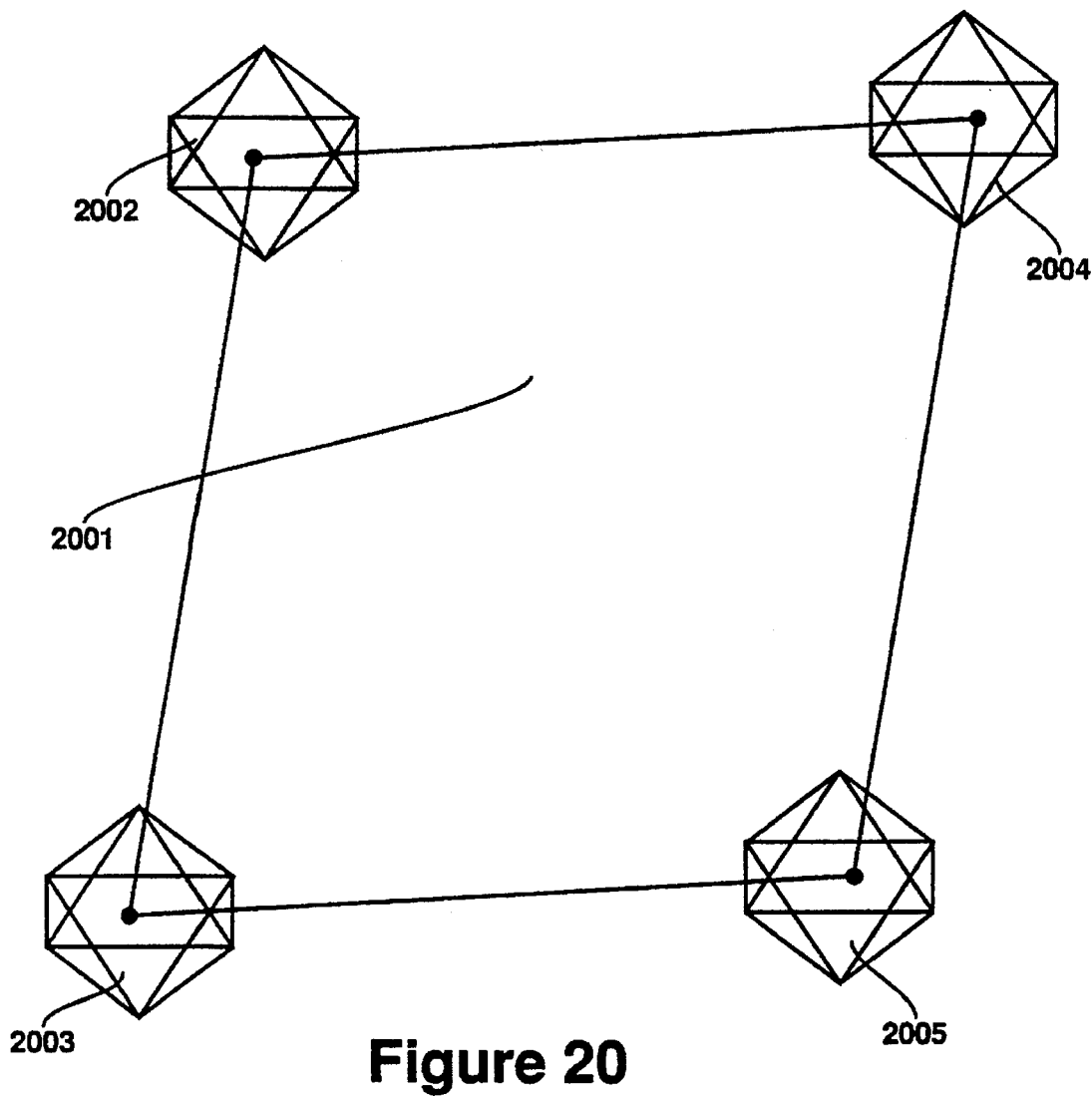
FIG. 20 illustrates the construction of a slab as may be performed by the preferred embodiment of the present invention.

FIG. 19 outlines the steps for construction of a slab. As before, polyhedral representation of spheres are constructed at each vertex point of the face of the object solid, step 1901. Such a construction is illustrated in FIG. 20. Here, the spheres 2002–2005 are the vertex points of the object solid 2001. Here, the vertex point that has the maximum projection in the direction of the face is identified, step 1902. This maximum projection represents the highest point or height of the slab. Finally, the slab structure is created by generating rectangles relative to the vertex point identified in step 1902, thus creating the sides of the slab, vertex point, step 1903. Two things should be noted. First, the vertex direction will in general, not be in the same direction in the face normal. Second, the slab thickness will in general, not be equal to the deposition thickness, and different slabs will have different thicknesses. However, like the case of the cylinder, the thickness variation will be within the limits of accuracy of the polyhedral representation of the sphere. The thickness variation can be reduced to as small a value as desired by choosing a more accurate polyhedral representation of the sphere.

Construction of Trajectory Solids for a Spatially Varying Process Step

As described above, in the case of a spatially varying process step, i.e. one where the deposition or etch rates vary across a wafer, all faces must be triangles. The reason for this is that if a face had more than three vertices, when the deposition or etch rates are not uniform, the face may be non-planar after the growth or etch process.

The construction of a sphere is similar, except that the radius of the spheres will differ at the vertex points (depending on the deposition or etch rate at that point). In the case of a slab, the construction is similar to that of the isotropic case except that each vertex of a triangular face is moved a different distance. This distance is determined by finding the vertex of the vertex trajectory solid having the maximum projection in the direction of the face. Because the size of each vertex trajectory solid depends on the local etch or deposition rate, the movement distance depends on the local etch or deposition rate.

The construction of a cylinder is similar to the isotropic construction except that the points defining the trajectory solid are projected onto the plane perpendicular to the edge in a different manner. Here, the points are projected onto the plane with respect to a third point which lies on a line which is an extension of the edge. This third point is the point along the edge at which the radius of a trajectory solid on that point would be zero. This is best described with respect to FIG. 21.

Figure 21:
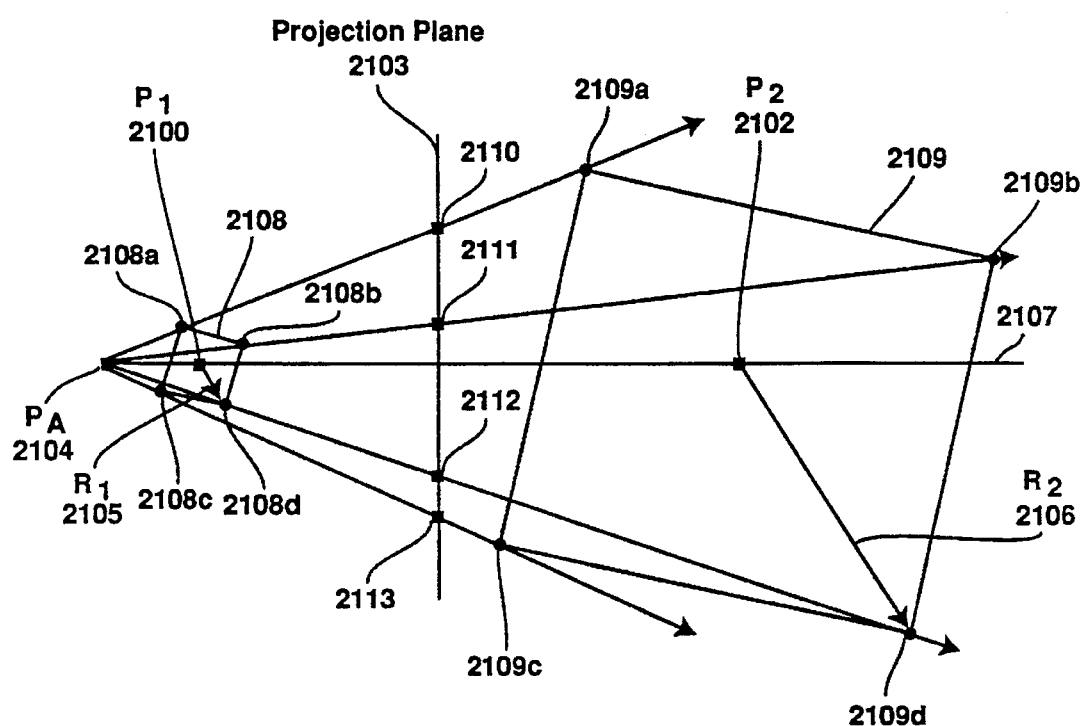
FIG. 21 illustrates the construction of a cylinder for a spatially varying process step as may be performed by the preferred embodiment of the present invention.

FIG. 21 illustrates the construction of a cylinder in 2-D. Here, the vertex point 2100 of edge 2107, is covered by a trajectory solid 2108. The trajectory solid 2108 has a radius R1 2105. A second vertex point 2102 of edge 2107 is covered by a trajectory solid 2109. The trajectory solid 2109 has a radius R2 2106. As is clear from FIG. 21, the radius R2 2106 is greater than the radius R1 2105. This is indicative of a spatially varying process step.

As described above, the vertex points of the trajectory solids are projected onto a plane 2103 that is perpendicular to the edge 2107. In this case, the vertex points are projected with respect to a point PA 2104. The point PA 2104 represents the point on the edge 2107 where the radius of a trajectory solid would be zero and is calculated using the equation:

$$\vec{PA} = \vec{P1} + (\vec{P1} - \vec{P2})\frac{R1}{R2 - R1}$$

The vertex points are then projected onto the plane using a ray having an origin at PA 2104 and passing through corresponding vertex points of the trajectory solids 2108 and 2109. Accordingly, vertex points 2108a and 2109a are projected as point 2110, vertex points 2108b and 2109b are projected as point 2111, vertex points 2108c and 2109c are projected as point 2113 and vertex points 2108d and 2109d are projected as point 2112. In this instance the convex hull points on the plane 2103 are 2110 and 2113 and the corresponding vertex points are 2108a, 2109a and 2108c, 2109c respectively. Thus, after the cylinder ends are constructed as described above, rectangles are formed from the points 2108a, 2108c to 2109a, 2109c to construct the cylinder.

Figure 22A:
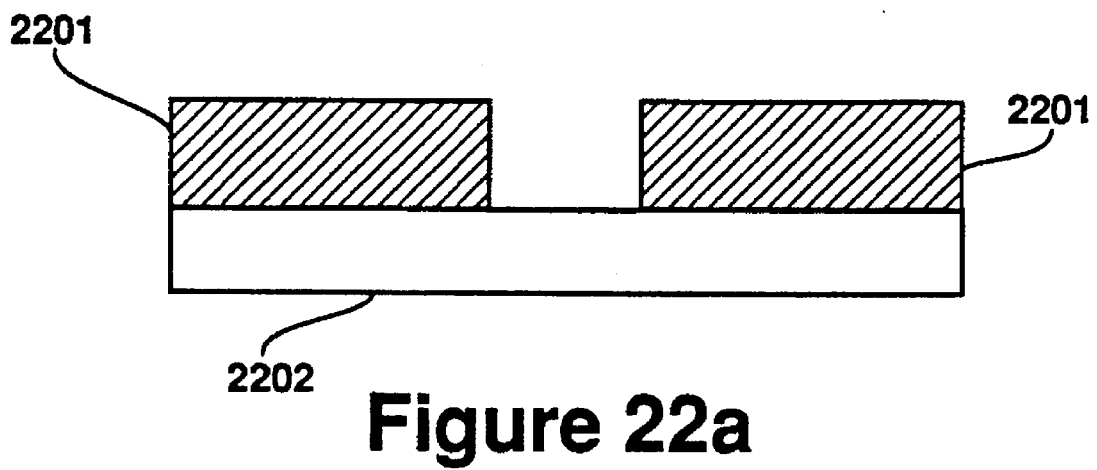
FIGS. 22a–22b illustrate before and after views of an etch process step where the respective material objects solids have different etch rates, as may be performed by the preferred embodiment of the present invention.
Figure 22B:
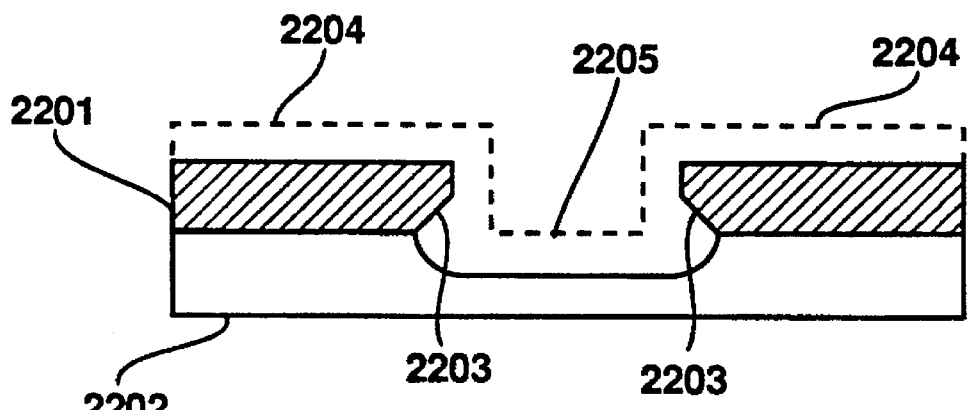

Construction of a Trajectory Solid for the Etching of Multiple Materials with Different Etch Rates At the interface of two materials with different etch rates, a wedge shaped trajectory solid is utilized in addition to the vertex spheres. FIGS. 22a–22b illustrate such an etching step in 2-D, but the same concepts would naturally extend to 3-D. Referring to FIG. 22a, a material 2201 with an etch rate of X has an interface with a material 2202 with an etch rate of Y, where etch rate Y is greater than etch rate X. After an etching step, the interface would be as illustrated in FIG. 22b. Of particular interest are the etched areas 2203, where a wedge shaped portion is etched out at the interface portion of material 2201.

The wedge shaped etched area 2203 is formed as the etching of material 2201 occurs and the interface surface of material 2201 becomes exposed. The wedge shape is created due to the gradual exposure of the material 2201. Also, illustrated in FIG. 22b are the cumulative effects of the etch rates on each of the materials. The dashed lines 2204 and 2205 indicate the original surface of the respective materials prior to the etch step.

The preferred embodiment of the present invention simulates such a process step by including a step where a cone shaped trajectory solid is created for a vertex point. As will be described below, this wedge shape is also used in the creation of the interface edge. It should first be noted that trajectory solids for the vertex points of the interface correspond to the etch rates of the different materials. So for any particular interface vertex points two concentric spheres are created, one for each material. Next, a cone shaped trajectory solid is created from two lines that are tangent to the sphere corresponding to the material with the lower etch rate. The common end point of the two tangent lines forming the cone would extend to a point at which the sphere with the higher etch rate intersects the interface plane. The cone shaped trajectory solid would extend around the radius of the sphere with the lower etch rate, thus creating a "flying saucer" shaped trajectory solid.

Figure 23A:
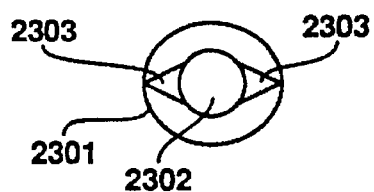
FIG. 23a–23b illustrate trajectory solids for the case of an etch process step where two material object solids have different etch rates, as may be performed by the preferred embodiment of the present invention.
Figure 23B:
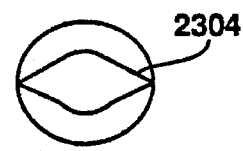

The collection of trajectory solids corresponding to an interface vertex point is illustrated in FIGS. 23a–23b. In FIG. 23a a sphere 2301 is used to perform a boolean operation with the material with the higher etch rate. Recall that the radius of a sphere corresponds to the etch rate. Sphere 2302 and cone shaped solid 2303 are combined to create a "flying saucer" shaped trajectory solid with which a boolean operation is performed upon the material with the lower etch rate. The combination of the sphere 2302 and cone shaped solid 2303 are illustrated in FIG. 23b as the trajectory solid 2304.

Figure 24A:
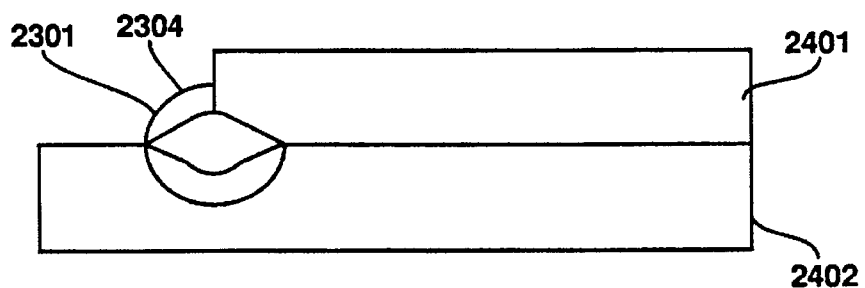
FIGS. 24a–24c illustrate the simulation of an etch process step where two material object solids have different etch rates, using the trajectory solids illustrated in FIG. 23b, as may be performed in the preferred embodiment of the present invention.
Figure 24B:
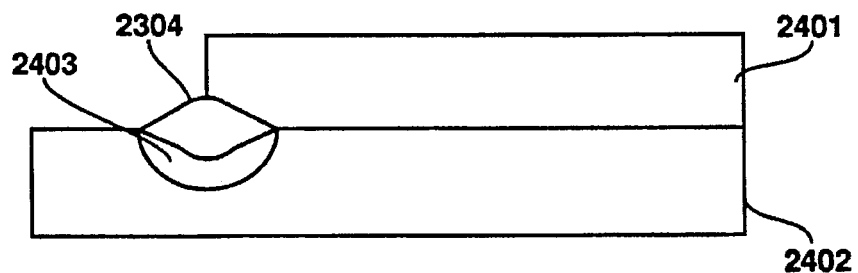
Figure 24C:
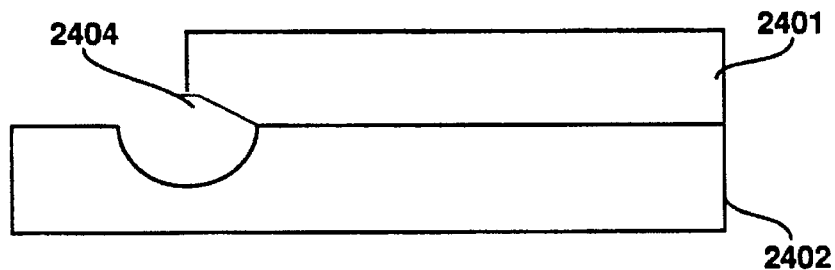

FIGS. 24a–24c illustrate the effect of the trajectory solids 2301 and 2304 on materials 2401 and 2402. Referring to FIG. 24a, the material 2402 has a higher etch rate than the material 2401. The trajectory solid 2301 corresponds to the etch at a vertex for material 2402. The trajectory solid 2304 corresponds to the etch at an intersection vertex for the material 2401. Referring now to FIG. 24b, a boolean difference operation between the trajectory solid 2301 and material solid 2402 results in an etched void 2403 being created. Referring now to FIG. 24c, a boolean difference operation between the trajectory solid 2304 and material solid 2401 results in an etched void 2404 being created. It should be noted that the etching here is only for the interface vertex point for materials 2401 and 2402. Further trajectory solids and corresponding boolean difference operations would be performed with the materials 2401 and 2402 to create the effect of the etch process step for the remaining exposed faces.

For the case of materials with different etch rates, an interface edge in the preferred embodiment would not be a cylinder. The shape of the trajectory solid for the interface edge of the material with a lower etch rate, would be constructed based on the "flying saucer" shaped trajectory solids located at the vertex points of the edge. The method of constructing the trajectory solid is identical to that of constructing a cylinder, i.e. identifying the convex hull points for the respective vertex trajectory solids and creating rectangles connecting the hull points.

Figure 25A:
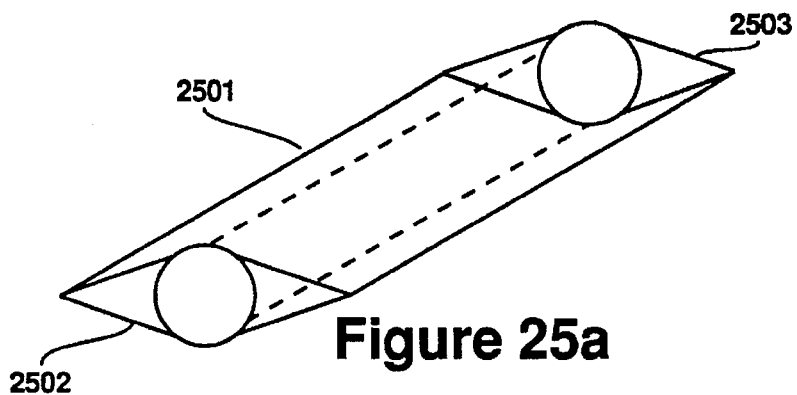
FIG. 25a is a perspective view illustrating the trajectory solid for an edge, for an etch process step where two material object solids have different etch rates, as may be performed in the preferred embodiment of the present invention.
Figure 25B:
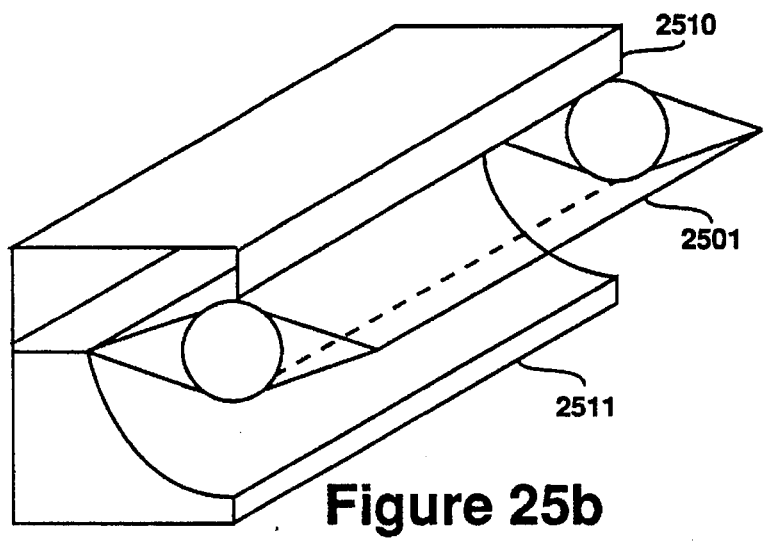
FIGS. 25b–25c are perspective views illustrating the trajectory solid of FIG. 25a as constructed in a topography simulation and after a boolean set difference operation, as may be performed in the preferred embodiment of the present invention.
Figure 25C:
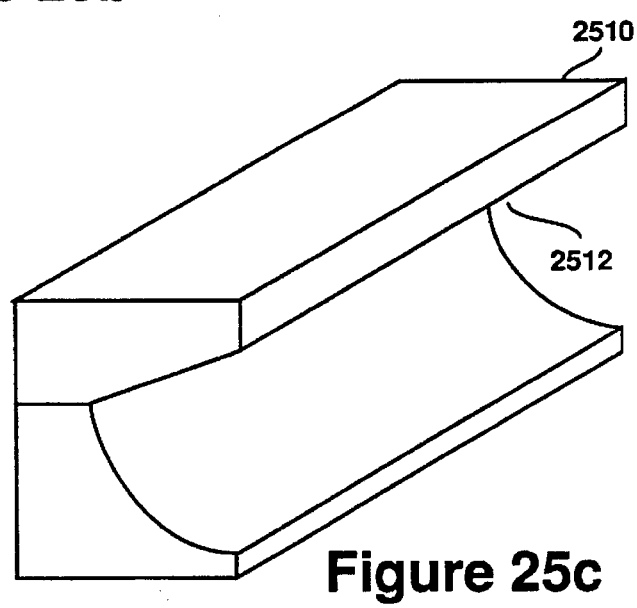

FIG. 25a illustrates a trajectory solid 2501 as would be constructed in the preferred embodiment. The trajectory solid is created from the trajectory solids 2502 and 2503 that are positioned at vertex points defining an edge. FIG. 25b illustrates the trajectory solid 2501 with respect to material solids 2510 and 2511. Here, the material solid 2510 has the slower etch rate. Further, a boolean operation has already been performed with a cylinder that would be constructed for the edge of material solid 2511, creating the etched void 2512. Referring now to FIG. 25c, an etched void 2512 in material 2510 is created as a result of the boolean difference operation between the trajectory solid 2501 and the material solid 2510.

Figure 26:
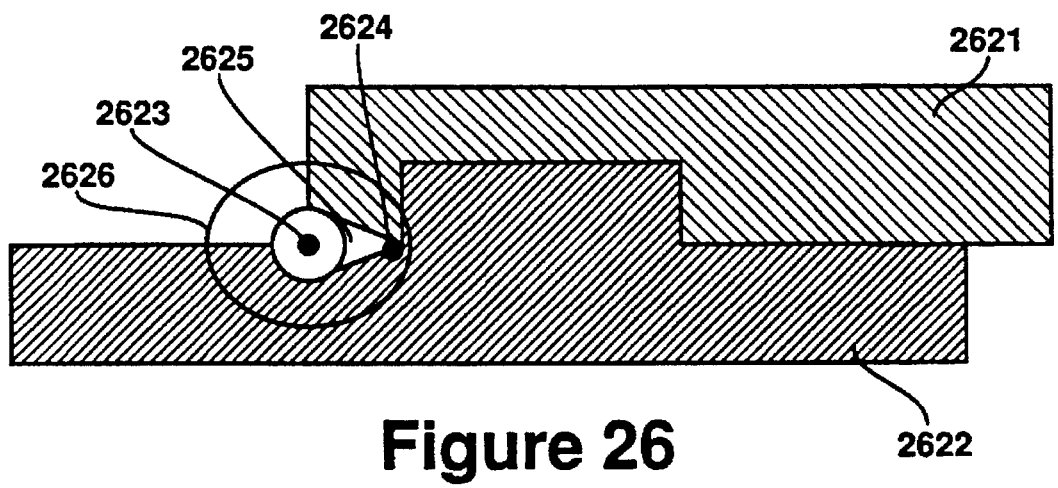
FIG. 26 illustrates a material solids structure where the interface between two material solids is non-planar.

An interesting case occurs for the materials structure illustrated in FIG. 26. Here a time-stepping of the process step may be utilized to obtain the proper result. Referring to FIG. 26 a material 2621 has been deposited over a material 2622 in a prior process step. It is possible that an etching step may be required where constructing a trajectory solid 2625 at vertex point 2623 may create an incorrect result at point 2624. This is because the method described above assumes that the interface between the two materials is planar. The etch rate of the material 2622 is illustrated in the radius of the hemisphere 2626. During the course of the etch the vertex point 2624 would be reached again exposing the material 2622 to an etch.

The general solution for this problem would be to subdivide the etch problem into smaller timesteps. The maximum inaccuracy would be reduced to the amount of etch during a single timestep.

Example of a Completed Simulation Multiple Process Steps

Figure 27:
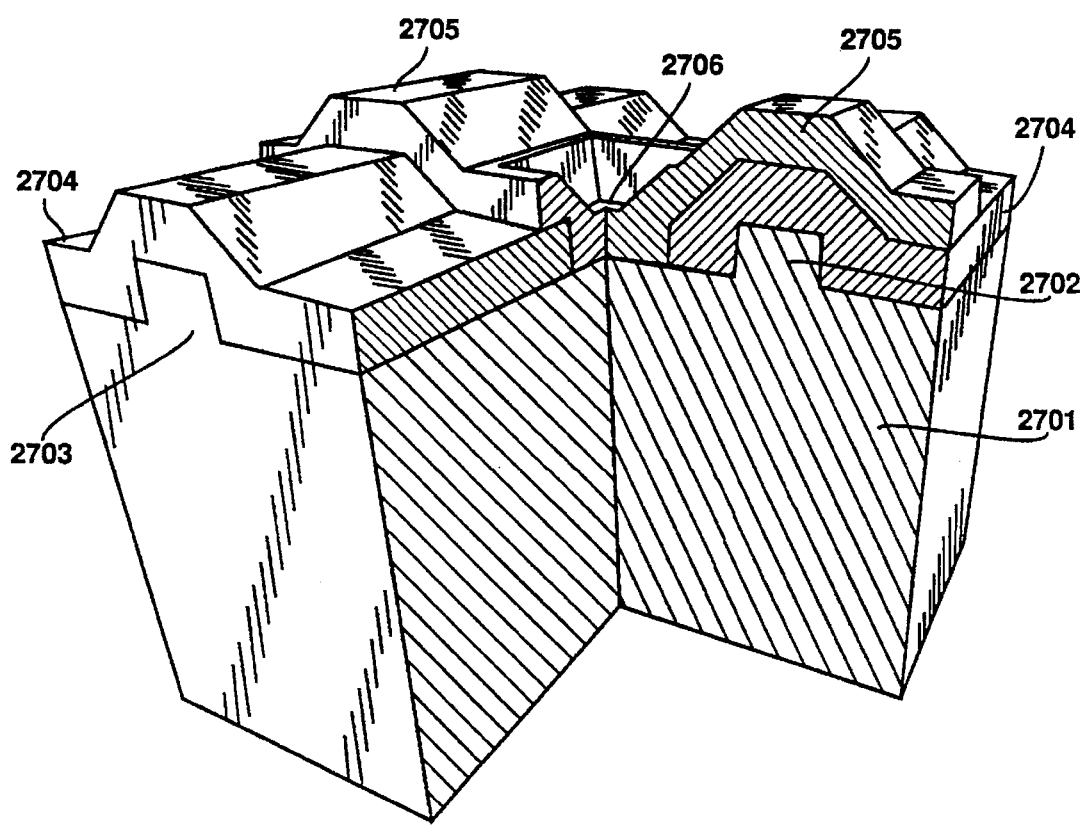
FIG. 27 is an illustration of a completed simulation of multiple process steps, as may be performed in the preferred embodiment of the present invention.

FIG. 27 is a cut-away view that illustrates a completed simulation of several process steps. Such a view is readily obtainable using a solids modeling system as described in the preferred embodiment of the present invention. Referring to FIG. 27, on a substrate 2701 having two (2) polysilicon leads 2702 and 2703, an oxide layer 2704 is deposited. Such a deposition step would be performed utilizing the methods described in the preferred embodiment of the present invention. An etch step is performed to create a hole 2706. The hole 2706 creates a means for connecting the metal to the substrate 2701. Finally, a further deposition causes a metal layer 2705 to be deposited above the oxide layer 2704. This deposition step would also be performed utilizing the methods described in the preferred embodiment.

As described above, such visualization of the topography of a wafer is valuable. Errors in the fabrication process may become readily apparent when being the results in this fashion.

Thus, a method for simulating the deformation of material layers on a wafer during a manufacturing process step is disclosed. Utilizing a generalized solids modeling and properly constructing trajectory solids, isotropic and anisotropic deposition and etch, or spatially varying process steps may be simulated.

We claim:

1. A method for changing a first geometric representation of a solid, said first geometric representation comprised of a plurality of vertex points, one or more edges and one or more faces, said method comprising the steps of:

a) constructing a first geometric object at each vertex point of said first geometric representation, one of said first geometric objects defining a larger space than one other first geometric object;

b) creating a first changed geometric representation from said first geometric objects and said first geometric representation;

c) constructing a second geometric object for each edge of said first geometric representation, each of said second geometric objects having a center axis along an edge corresponding to each of said second geometric objects;

d) creating a second changed geometric representation from said second geometric objects and said first changed geometric representation;

e) constructing a third geometric object for each of said one or more faces of said first geometric representation, each of said third geometric objects having a face parallel to a corresponding face of said first geometric representation; and f) creating a third changed geometric representation from said third geometric objects and said second changed geometric representation.

2. The method as recited in claim 1 wherein said step of constructing said second geometric object for each edge of said first geometric representation, each of said one or more edges defining at least two vertex points, said step comprising the steps of:

a) constructing a plane perpendicular to said edge;

b) providing a first polyhedron, representing a first one of said first geometric objects, at a first of said vertex points, said first polyhedron including a first plurality of points;

c) providing a second polyhedron, representing a second one of said first geometric objects, at a second of said vertex points, said second polyhedron including a second plurality of points;

d) projecting points of said first polyhedron perpendicularly onto said plane to create a set of projected points;

e) identifying convex hull points of said set of projected points;

f) constructing a first end face of said second geometric object, said first end face constructed by connecting points of said first polyhedron corresponding to said convex hull points with said first vertex point; and g) creating rectangles defined by pairs of points of said first polyhedron corresponding to said convex hull points and corresponding pairs of points of second polyhedron.

3. The method as recited in claim 2 wherein each of said one or more faces of said geometric representation includes a plurality of vertex points, said step of constructing said third geometric object for each face of said one or more faces of said first geometric representation is comprised of the steps of:

a) providing a polyhedron representing said first geometric object at each vertex point of said plurality of vertex points included in a face;

b) determining a first vertex point of the polyhedron that corresponds to a maximum projection value of a first vector in a direction away from said face; and c) creating rectangles along said face using said first vector, said first vector defining one axis of said rectangles.

4. The method as recited in claim 3 wherein said step of creating said first changed geometric representation from said first geometric objects and said geometric representation is comprised of the steps of:

a) performing a first boolean set operation between a first of said first geometric objects and said geometric representation; and b) performing a second boolean set operation between a second of said first geometric objects and a resultant solid from step a).

5. The method as recited in claim 4 wherein said step of creating said second changed geometric representation from said second geometric objects and said first changed geometric representation is comprised of the steps of:

a) performing a third boolean set operation between a first of said second geometric objects and said first changed geometric representation; and b) performing a fourth boolean set operation between a second of said second geometric objects the resultant solid from step a).

6. The method as recited in claim 5 wherein said step of creating said third changed geometric representation from said third geometric objects and said second changed geometric representation is comprised of the steps of:

a) performing a fifth boolean set operation between a first of said third geometric objects and said second changed geometric representation; and b) performing a sixth boolean set operation between a second of said third geometric objects and the resultant solid from step a).

7. The method as recited in claim 6 wherein said second geometric object is a polyhedral representation of a cylinder and said third geometric object is a polyhedral representation of a slab.

8. The method as recited in claim 7 wherein said first geometric object is an ellipsoid.

9. The method as recited in claim 8 wherein said first boolean set operation and second boolean set operation are union operations.

10. The method as recited in claim 8 wherein said first boolean set operation and second boolean set operation are difference operations.

11. A method for simulating changes to a topography of a workpiece as it undergoes a process step, said method comprising the steps of:

a) providing a solid model of said workpiece;

b) constructing a first trajectory solid, said first trajectory solid corresponding to a first predetermined structure of said solid model, said first trajectory solid having a characteristic X corresponding to a first rate of change;

c) constructing a second trajectory solid corresponding to a second predetermined structure of said solid model, said second trajectory solid having a characteristic Y corresponding to a second rate of change, Y being different from X; and d) performing a first boolean operation between said solid model of said workpiece, said first trajectory solid and said second trajectory solid.

12. The method of claim 11 wherein said characteristic X corresponds to a first etch rate or a first deposition rate.

13. The method of claim 12 wherein said first trajectory solid is a polyhedral representation of an ellipsoid, said characteristic X is a radius of said ellipsoid, and said first predetermined structure is a vertex.

14. The method of claim 13, said method further comprising the steps of:

a) constructing a third trajectory solid corresponding to a third predetermined structure of said solid model of said workpiece, said third trajectory solid having a characteristic Z; and b) performing a second boolean operation between said solid model of said workpiece and said third trajectory solid.

15. The method of claim 14 wherein said characteristic Z corresponds to a second etch rate or a second deposition rate.

16. The method of claim 15 wherein said third trajectory solid is a polyhedral representation of a cylinder, said characteristic Z is a radius of said cylinder, and said third predetermined structure is an edge.

* * * * *